(12) United States Patent
Sonara et al.

(10) Patent No.: US 12,281,029 B2
(45) Date of Patent: Apr. 22, 2025

(54) MODEL PREDICTIVE CONTROL SYSTEM AND METHOD USING NEURAL NETWORK TO CONTROL DISSOLVED OXYGEN AND PH IN SEAWATER

(71) Applicant: Saudi Arabian Oil Company, Dhahran (SA)

(72) Inventors: Prafulchandra Bhavanbhai Sonara, Abqaiq (SA); Abdulrahman S. Johar, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 449 days.

(21) Appl. No.: 17/655,631

(22) Filed: Mar. 21, 2022

(65) Prior Publication Data

US 2023/0295009 A1  Sep. 21, 2023

(51) Int. Cl.
*C02F 1/00* (2023.01)
*C02F 1/20* (2023.01)
(Continued)

(52) U.S. Cl.
CPC ............ *C02F 1/008* (2013.01); *C02F 1/20* (2013.01); *C02F 1/685* (2013.01); *G05B 13/027* (2013.01);
(Continued)

(58) Field of Classification Search
CPC ..... G05B 13/042; G05B 13/048; C02F 1/008; C02F 1/20; C02F 1/685; C02F 2101/10;
(Continued)

(56) References Cited

U.S. PATENT DOCUMENTS

| 4,612,021 A | 9/1986 | Bland |
|---|---|---|
| 8,449,656 B2 | 5/2013 | Wu |

(Continued)

FOREIGN PATENT DOCUMENTS

| CN | 108563118 B | 9/2018 |
|---|---|---|
| CN | 109002888 A | 12/2018 |

(Continued)

OTHER PUBLICATIONS

Huang et al, English machine translation CN 110610261 A, pp. 1-5 (Year: 2019).*

(Continued)

*Primary Examiner* — Claire A Norris
(74) *Attorney, Agent, or Firm* — Leason Ellis LLP

(57) ABSTRACT

A system and method for model predictive control of a process for removing dissolved oxygen (DO) from seawater to produce treated seawater having less than a prescribed DO concentration and a prescribed pH is disclosed. The model predictive control system includes a machine learning (ML) module for calculating, based on the values of operational input parameters, a predicted DO concentration and a predicted pH of the treated seawater for a future point in time. An ML-based control module is configured to determine, based on the predicted DO concentration, predicted pH and the input parameters, settings for adjusting controllable operational input parameters that serve to change the DO concentration or pH of the treated seawater. The control system monitors DO and pH during operation to dynamically update the DO and pH predictions, and adaptively update system settings to produce treated seawater having less than the prescribed DO concentration and pH.

17 Claims, 22 Drawing Sheets

(51) Int. Cl.
| | |
|---|---|
| *C02F 1/68* | (2023.01) |
| *C02F 101/10* | (2006.01) |
| *C02F 103/08* | (2006.01) |
| *G05B 13/02* | (2006.01) |
| *G05B 13/04* | (2006.01) |
| *G06N 20/00* | (2019.01) |

(52) U.S. Cl.
CPC .......... G05B 13/048 (2013.01); G06N 20/00 (2019.01); *C02F 2101/10* (2013.01); *C02F 2103/08* (2013.01); *C02F 2209/06* (2013.01); *C02F 2209/22* (2013.01); *C02F 2305/00* (2013.01)

(58) Field of Classification Search
CPC ............ C02F 2103/008; C02F 2209/06; C02F 2209/22; C02F 2305/00; G06N 20/00
USPC ......................................................... 210/739
See application file for complete search history.

(56) References Cited

U.S. PATENT DOCUMENTS

| | | | |
|---|---|---|---|
| 9,222,348 B2 | 12/2015 | Freese et al. | |
| 9,747,544 B2 | 8/2017 | Wan et al. | |
| 2014/0052422 A1 | 2/2014 | Wan et al. | |
| 2020/0010336 A1 | 1/2020 | Montestruque | |

FOREIGN PATENT DOCUMENTS

| | | | | |
|---|---|---|---|---|
| CN | 110610261 A | * | 12/2019 | ............. G06N 3/006 |
| CN | 111105079 A | | 5/2020 | |
| CN | 113608444 A | * | 11/2021 | ............. C02F 1/008 |
| GB | 2137378 A | | 10/1984 | |
| GB | 2474559 A | | 4/2011 | |
| JP | 4341164 B2 | | 10/2009 | |

OTHER PUBLICATIONS

Zhou et al, English machine translation CN 113608444 A, pp. 1-13 (Year: 2021).*

Durdevic, P. et al; Potential for Real-Time Monitoring and Control of Dissolved Oxygen in the Injection Water Treatment Process; https://doi.org/10.1016/j.ifacol.2018.06.373; Jul. 19, 2018.

McCairns, M.; Achieving effective control of deaeration chemical dosing using artificial neural; University of Southern Queensland Undergraduate Engineering and Built Environment Project Conference, Toowoomba, Australia (2018), p. 99; Sep. 24, 2018.

Palani, S. et al.; Development of a neural network model for dissolved oxygen in seawater, http://nopr.niscair.res.in/handle/123456789/4664; Jun. 1, 2019.

Abdi, A. et al.; Application of artificial neural network in deoxygenation of water by glucoseoxidase immobilized in calcium alginate/MnO2 composite; Iranian Journal of Chemical Engineering (2018), 15 (3): 82-93; 2018.

Han, H.G. et al.; Model predictive control of dissolved oxygen concentration based on a self-organizing RBF neural network; Control Engineering Practice (2012), 20 (4): 465-476; https://doi.org/10.1016/j.conengprac.2012.01.001; Jan. 20, 2012.

Holenda, B. et al.; Dissolved oxygen control of the activated sludge wastewater treatment process using model predictive control; Computers and Chemical Engineering (2008), 32: 1270-1278 https://doi.org/10.1016/j.compchemeng.2007.06.008; Jun. 19, 2007.

Ifezue, D. et al.; Root Cause Failure Analysis and Mitigation of Corrosion in Seawater Injection Piping; Journal of Failure Analysis and Prevention (2016), 16: 255-263 https://doi.org/10.1007/s11668-016-0074-5; Feb. 10, 2016.

Office Action in corresponding Saudi Arabian Application No. 123446792 mailed May 7, 2024; 10 pages.

* cited by examiner

NOTES:
1- FY-1767 CALCULATES THE REMOTE SET POINT FOR FIC-1767. SEE COFPIOL NARRAT
2- OTHER PROCESS PARAMETERS: DP UPSTREAM FILTERS, WATER TEMPERATURE, PUMP ON/OFF,

LEGEND

PIPING MATERIAL
SPECIFICATION SAES-L-185

———— PROCESS LINE

—//— INSTRUMENT AIR LINE

— — — INSTRUMENT ELECTRICAL LINE

REDUCER

SPECTACLE PLATE-OPEN

INSTRUMENT DEFINITION & SYMBOLS SAES-J-103

| | | | |
|---|---|---|---|
| AC/AFO | -AIR TO CLOSE AIR FAILURE OPEN | VE | -VIBRATION ELEMENT |
| AC/AFS | -AIR TO CLOSE/AIR FAILURE STEADY | VS | -VIBRATION SWITCH |
| AC/AFS | -AIR TO OPEN/AIR FAILURE CLOSE | VT | -VIBRATION TRANSMITTER |
| AO/AFS | -AIR TO OPEN/AIR FAILURE STEADY | XL | -PILOT LIGHT (NOT FOR MOTOR) |
| AOV | -AIR OPERATED VALVE | LS | -LIMIT SWITCH |
| AT | -ANALYZER TRANSMITTER | ZV | -SAFETY SHUTDOWN VALVE |
| DT | -DENSITY TRANSMITTER | | |
| ESD | -EVER SHUTDOWN SYSTEM | | |
| FC | -FLOW CONTROLLER | | |
| FV | -FLOW CONTROL VALVE | | |

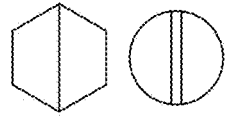

DATALOCKER POINT
F-FLOW  P-PRESS
L-LEVEL  T-TEMP  } INPUTS
X-MISC  A-ALARM

LOCAL PANEL
MOUNTED INSTR.

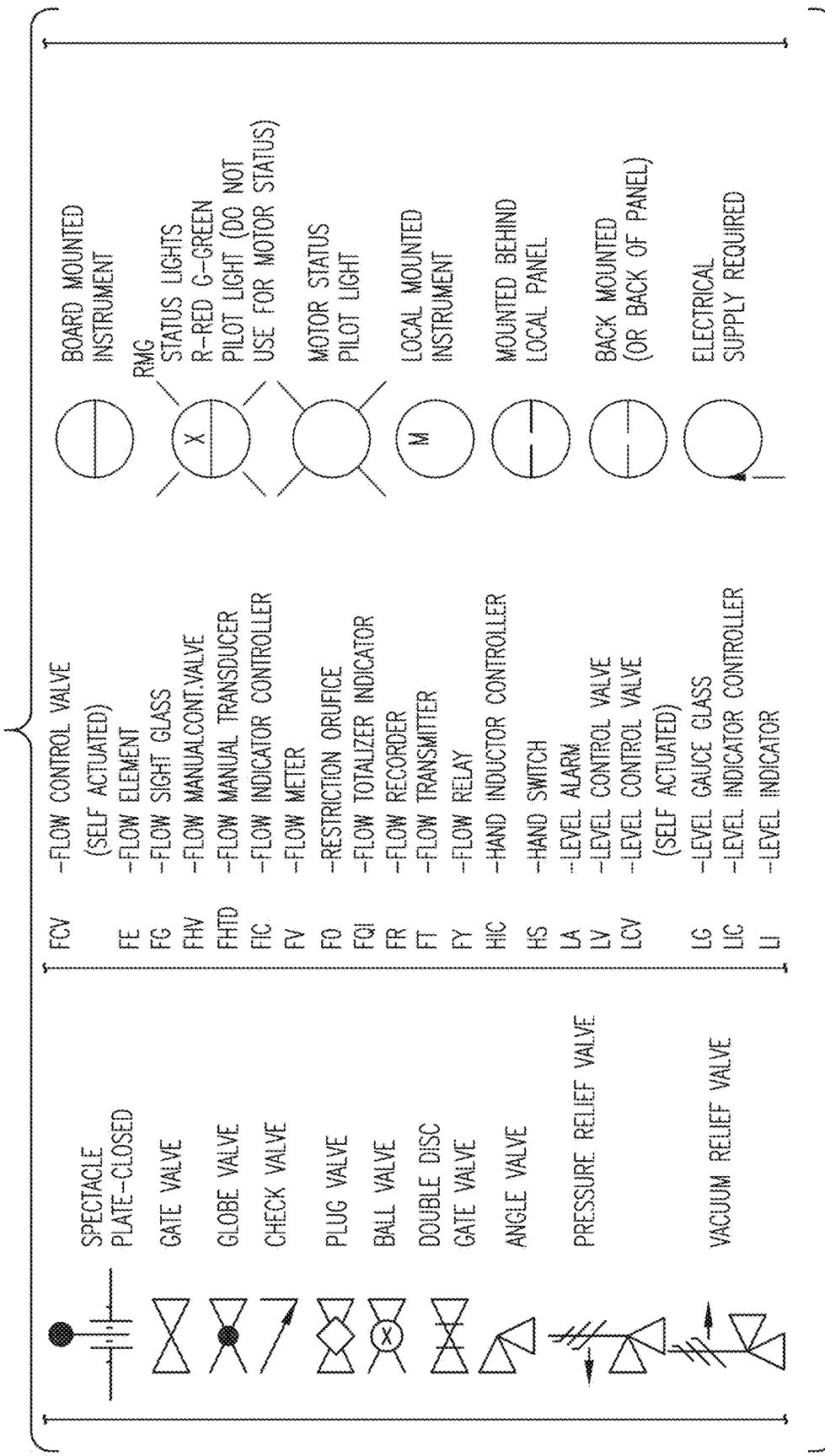

| | |
|---|---|
| ○ | (DCS) DISTRIBUTED CONTROL SYSTEM OPERATOR INACCESSIBLE IN FIELD |

DISTRIBUTED CONTROL
INTERCONNECTING LOGIC
CONTROLLER WITH BINARY
OR SEQUENTIAL FUNCTIONS

| | |
|---|---|
| ◇ | (PLC) PROGRAMMABLE LOGIC CONTROLLER, NORMALLY INACCESSIBLE OR BEHIND THE PANEL DEVICE OR FUNCTIONS |
| ◫ | (PLC) PROGRAMMABLE LOGIC CONTROLLER FUNCTION, CAN BE NORMALLY DISPLAYED ON CRT |
| ◫ | LOCAL DCS OR DCS LOCATION NORMALLY ACCESSIBLE TO OPERATOR |
| ⊟ | (PLC) PROGRAMMABLE LOGIC CONTROLLER NO POINT NORMALLY INACCESSIBLE BY OPERATOR |

| | |
|---|---|
| PI | -PRESSURE INDICATOR |
| PIC | -PRESSURE INDICATOR CONTROLLER |
| PR | -PRESSURE RECORDER |
| PR | -PRESSURE SWITCH |
| PT | -PRESSURE TRANSMITTER |
| PX | -PRESSURE POINT |
| PY | -PRESSURE COMPUTATION MOD |
| PZV | -PRESSURE RELIEF VALVE |
| RTD | -RESIST. TEMP. DETECTOR |
| SI | -SPEED INDICATOR |
| SS | -SPEED SWITCH |
| TC | -TEMP. CONTROLLER |
| TV | -TEMP. CONTROL VALVE |
| TCV | -TEMP. CONTROL VALVE (SELF ACTUATED) |
| TE | -TEMP. ELEMENT |
| TG | -THERMOMETER |
| THS | -TEMP. HAND SWITCH |
| TI | -TEMP. INDICATOR |
| TR | -TEMP. RECORDER |
| TS | -TEMP. SWITCH |
| TT | -TEMP. TRANSMITTER |
| TTD | -TEMP. TRANSDUCER |
| TW | -THERMOWELL |

| | |
|---|---|
| TSO | -TIGHT SHUT OFF |
| S.C. | -SAMPLE CONN. |
| | -DRAIN TO PRESSURE SEWER |
| OWS | OILY WATER SEWER |
| D | -DRAIN |
| V | -VENT |

FIG.6L

Cont. From FIG.6K

MODEL PREDICTIVE CONTROL SYSTEM AND METHOD USING NEURAL NETWORK TO CONTROL DISSOLVED OXYGEN AND PH IN SEAWATER

FIELD OF THE DISCLOSURE

The present disclosure is directed to process control systems and, more particularly to a system and/or method that uses machine learning such as neural networks to control amounts of dissolved oxygen (DO) and pH of treated seawater.

BACKGROUND OF THE DISCLOSURE

Seawater is typically treated to remove DO before it can be injected into oil or gas reservoirs to maintain pressure. However, because raw (or naturally occurring) seawater has DO concentration of around 9000 to 11,000 parts per billion (ppb), the treatment of seawater requires removal of DO to maintain a DO concentration less than 10 ppb. Reducing the DO concentration of seawater to such low values is challenging. Conventional technologies are incapable or ineffective for reducing DO of seawater to less than 10 ppb.

SUMMARY OF THE DISCLOSURE

According to an aspect of the present disclosure, there is provided a method for model predictive control of a seawater treatment system for removing dissolved oxygen (DO) from seawater to produce treated seawater having less than prescribed DO concentration and a prescribed pH.

In the treatment system, an inlet provides untreated seawater into a vessel of the treatment system at an inflow rate which is controllable by a feed flow control valve (FCV), a N2 feed line delivers N2 gas into the vessel at an N2 flow rate which is controllable by an N2 FCV, an SO2 feed line delivers an SO2 solution into the vessel at an SO2 flow rate which is controllable by an SO2 FCV, and wherein the treated seawater is output from the vessel through an outlet.

The method comprises the steps of receiving, at a processor of a controller computing device executing program code that is in the form of one or more software modules and stored in a non-transitory storage medium, values of operational input parameters of the saltwater treatment system including, the inflow rate, the N2 flow rate, the SO2 flow rate, DO concentration of the treated seawater, and a pH of the treated seawater, and wherein the inflow rate, the N2 flow rate and the SO2 flow rate are controllable operational input parameters. The method also includes the step of calculating, with the processor using a predictive machine learning model and based on the values of the operational input parameters, a predicted DO concentration and a predicted pH of the treated seawater for a future point in time. The method also includes the step of determining, with the processor using a model predictive control algorithm and based on the predicted DO concentration and predicted pH and one or more of the operational input parameters, a setting for adjusting one of the controllable operational input parameters to change or maintain the DO concentration or pH of the treated seawater.

The method also includes the step of controlling, with the processor, operation of the seawater treatment system according to the setting, wherein the controlling step comprises sending, by the processor to the seawater treatment system over a communication interface, a control signal configured to adjust one or more of the feed FCV, N2 FCV and the SO2 FCV as a function of the setting. The method also includes the step of monitoring, with the processor, at least the DO concentration and the pH of the treated seawater during operation of the seawater treatment system, wherein the DO concentration and the pH are measured using one or more sensors exposed to the treated seawater. Additionally, the method includes the step of based on the monitoring step, dynamically performing, with the processor during operation of the seawater treatment system, the calculating, determining and controlling steps such that the treated seawater output has less than the prescribed DO concentration and has less than the prescribed pH.

According to a further aspect, a model predictive control system is provided for controlling operation of a seawater treatment system for removing dissolved oxygen (DO) from seawater to produce treated seawater having less than prescribed DO concentration and a prescribed pH. In particular, the seawater treatment system includes an inlet providing untreated seawater into a vessel of the treatment system at an inflow rate which is controllable by a feed flow control valve (FCV), a N2 feed line delivering N2 gas into the vessel at an N2 flow rate which is controllable by an N2 FCV, an SO2 feed line delivering an SO2 solution into the vessel at an SO2 flow rate which is controllable by an SO2 FCV, and an outlet through which the treated seawater is output from the vessel.

The model predictive control system comprises a controller computing device including a processor, an input/output interface, a non-transitory computer readable storage medium, and one or more software modules stored in the storage medium and executable by the processor. In particular, the software modules include an input module that configures the processor to receive values for operational input parameters of the saltwater treatment system including, the inflow rate, the N2 flow rate, the SO2 flow rate, a DO concentration of the treated seawater, and a pH of the treated seawater, wherein the inflow rate, the N2 flow rate and the SO2 flow rate are controllable operational input parameters.

The software modules also include a machine learning (ML) module, that configures the processor to calculate, based on the values of the operational input parameters, a predicted DO concentration and a predicted pH of the treated seawater for a future point in time.

The software modules also include a model predictive control module that configures the processor to, based on the predicted DO concentration and predicted pH and one or more of the values of the operational input parameters, define a setting for adjusting one of the controllable operational input parameters to change or maintain the DO concentration or pH of the treated seawater. Moreover, the model predictive control module further configures the processor to send a control signal for adjusting one or more of the feed FCV, N2 FCV and the SO2 FCV as a function of the setting.

The processor is further configured to monitor at least the values for DO concentration and pH during operation of the seawater treatment system and dynamically update the predicted DO concentration and predicted PH, and accordingly update the setting to adaptively control operation of the seawater treatment system to produce treated seawater having less than the prescribed DO concentration and less than the prescribed pH.

These and other aspects, features, and advantages can be appreciated from the accompanying description of certain embodiments of the disclosure and the accompanying drawing figures and claims.

BRIEF DESCRIPTION OF THE DRAWINGS

The foregoing and other features of the arrangements of the present disclosure will be more readily apparent from the following detailed description and drawings of an illustrative embodiment of an invention encompassed by the disclosure.

FIG. 6A-6L are enlarged partial views of the schematic diagram of FIG. 6 that combine to form the whole schematic of the exemplary deaerator shown in FIG. 6, according to an embodiment;

DESCRIPTION OF CERTAIN EMBODIMENTS OF THE DISCLOSURE

Figure 1A:
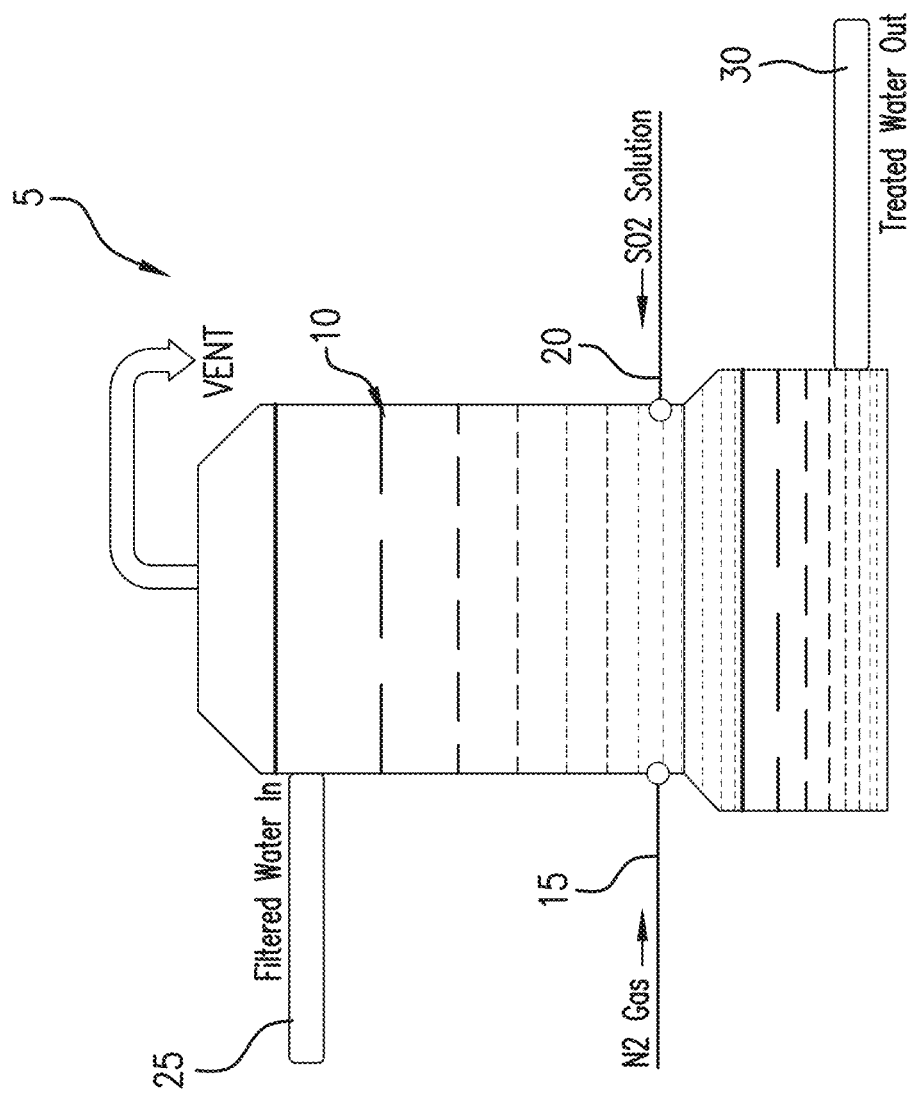
FIG. 1A is a cut-away side view system diagram illustrating an exemplary deaerator system.

By way of overview and introduction, embodiments of the systems and methods disclosed herein generally concern aspects of a control system and method for controlling operation of a seawater treatment system. More particularly the embodiments are directed to a system and method for generating and implementing a control solution that is capable of controlling a process for removing dissolved oxygen (DO) from seawater to produce treated seawater having less than a prescribed DO concentration and having a prescribed pH level.

In one or more embodiments, "Big Data" analytics and machine learning techniques, such as neural network technology, are used to create a predictive model to adaptively control operation of the seawater treatment system to produce treated seawater having the desired DO and pH levels. More specifically, in an embodiment, machine learning techniques are applied to past processing data for a seawater treatment system to develop a model for predicting future levels of DO and pH from current processing data. Additionally, in an embodiment, machine learning techniques are applied to processing data that is gathered during step-testing of the system in order to generate a model for controlling various operational settings of the treatment system. The control model operates based on the current processing data and the predicted levels of DO and pH generated by the predictive model. Accordingly, the embodiments are referred to as model predictive control systems and methods. In an embodiment, the control model is configured to control the flow of SO2 Solution and N2 Gas into a deaerator such that the DO concentration of the processed/treated seawater it outputs is maintained at less than 10 parts per billion (ppb) and pH is maintained between 6.9 to 7.8.

Injection of seawater into an oil & gas reservoir is a critical operation to maintain the health of the reservoir. Seawater after treatment is injected into the reservoir to maintain its pressure. Seawater used for injection needs to comply with certain requirements. Maintaining DO and pH concentration between required values are two critical requirements. Raw seawater has a DO concentration of around 9000 to 11,000 parts per billion (ppb). Accordingly, one of the most important seawater treatment is to remove DO from seawater and, preferably, maintain its concentration to less than 10 ppb. Reducing the DO concentration of seawater to such a low value is quite challenging.

DO concentration of the treated seawater depends on various process parameters of the treatment plant, which can include treatment filters and deaerators. Conventional instruments and control systems are not effective at reducing the DO of seawater to less than 10 ppb. Higher concentration of DO in treated seawater causes high corrosion in downstream pipes and downstream equipment. Severe downstream pipeline corrosion is one of the major challenges of using seawater for reservoir injection. Exemplary systems and methods for model predictive control of a seawater treatment system disclosed herein effectively addresses these challenges.

The systems and methods disclosed herein can implemented using existing infrastructure available in typical seawater processing plants. For instance, most modern plants involved in seawater treatment typically have Distributed Control System (DCS) operatively connected to various field instruments and field control devices to measure and control process parameters like pressure, temperature, flow and level. A DCS is a computerized control system for a process or plant comprising many control loops and in which autonomous controllers are typically distributed throughout the system. Accordingly, in an embodiment, the exemplary systems and methods for predictive model control are implemented using the computing resources of the DCS system.

Under traditional approaches to controlling and maintaining a given process system parameter, various field devices can be used including, standard field instruments that measure a process variable (PV), final control elements (e.g., a Control Valve) for controlling a controlled parameter, and a PID based controller. PID controls work effectively when there is only one variable parameter and one parameter is required to be controlled. Traditional PID-based controls, however, are not very effective at controlling processes where multiple process variables all affect a final product, such as the processes for removing DO from seawater.

A deaerator is one example of a seawater treatment system that embodiments of the model predictive control systems and methods are useable with. FIG. 1A is a simplified cut-away side-view of a conventional deaerator system 5 for performing a typical DO removal process. The deaerator comprises a vessel 10. Filtered seawater is injected into the vessel near a top end via a liquid feed 25. Nitrogen (N2) gas and a sulfurous acid (SO2) solution can be injected through respective inlets 15 and 20, provided near the mid-level of the deaerator. Due to gravity, seawater will flow down within the deaerator in the direction from top to bottom and N2 gas will flow up toward the top. Treated seawater is output from the deaerator via an outlet feed 30, provided near the bottom of the vessel 5.

The deaerator is a specialized vessel which has a particular geometry and various internal components, for example, a plurality of trays (e.g., 14 trays, not shown) having through-holes. These trays are designed such that the water flows down and N2 gas flows up through these holes. In this process, N2 gas comes in close contact with seawater and, in this process, the N2 gas removes DO from seawater. This process is called mechanical stripping and can reduce DO concentration of seawater to less than 300 ppb. The efficiency of DO removal, however, depends upon how closely N2 Gas is mixed with seawater. This, in turn, depends on the flow rate of seawater, flow rate of N2 Gas and the internal geometry of the deaerator. Methods of removal of DO from water by purging inert gas through water are known and the embodiments using nitrogen as the inert gas to remove DO from seawater are provided as a non-limiting example.

With respect to mechanical stripping process, DO removal efficiency depends on the nitrogen gas contact area with the seawater and contact time. This in turn depends on the deaerator's geometry, water flow rate and the N2 gas flow rate. The deaerator geometry is constant and other two flow rates are measured and controllable using the DCS system. DO of seawater is also dependent on its temperature. Accordingly, in an embodiment, the foregoing facts relating to the mechanical stripping are used, in addition to prior operational data and machine learning algorithms, to generate the predictive model for predicting DO of treated seawater from operational data measured from the deaerator.

Additionally, Sulfurous Acid (SO2) solution is a known oxygen scavenger that can be used to remove DO from seawater in an embodiment. In the exemplary deaerator system, an injected SO2 Solution flows down from about the mid-point of the deaerator and it is mixed with the seawater at the bottom end of the deaerator. The SO2 solution reacts with seawater which can further reduce DO concentration to less than 10 ppb by a process known as "SO2 Solution Scavenging." Normal PH of raw seawater is 7.6 to 7.9. SO2 solution injected to remove DO from seawater is highly acidic. Accordingly, as more SO2 is added, the pH of seawater gets lower. Effectively, pH of Treated Seawater is directly related to the total seawater feed into Deaerator and SO2 Solution injected. The higher the amounts of SO2 Solution injected, the lower the PH of Treated Seawater will be. Strongly acidic seawater is also an undesirable feature.

The efficiency of using SO2 solution for removal of DO by chemical reaction is dependent on reaction-time and concentration of SO2. Time of reaction is dependent on the geometry of the deaerator, which is known and constant, the volume of seawater in the deaerator and total water flowrate. These variable parameter values are measured and available in the DCS and, accordingly, are used for estimating residual DO in an embodiment. Additionally, the pH of treated seawater depends almost entirely on the quantity of SO2 Solution injected. Accordingly, in an embodiment, the foregoing facts relating to the chemical DO removal processes are used, in addition to prior operational data and machine learning techniques, to generate a predictive model configured to predict the DO and pH of treated seawater from live operational data measured from a deaerator.

Figure 1B:
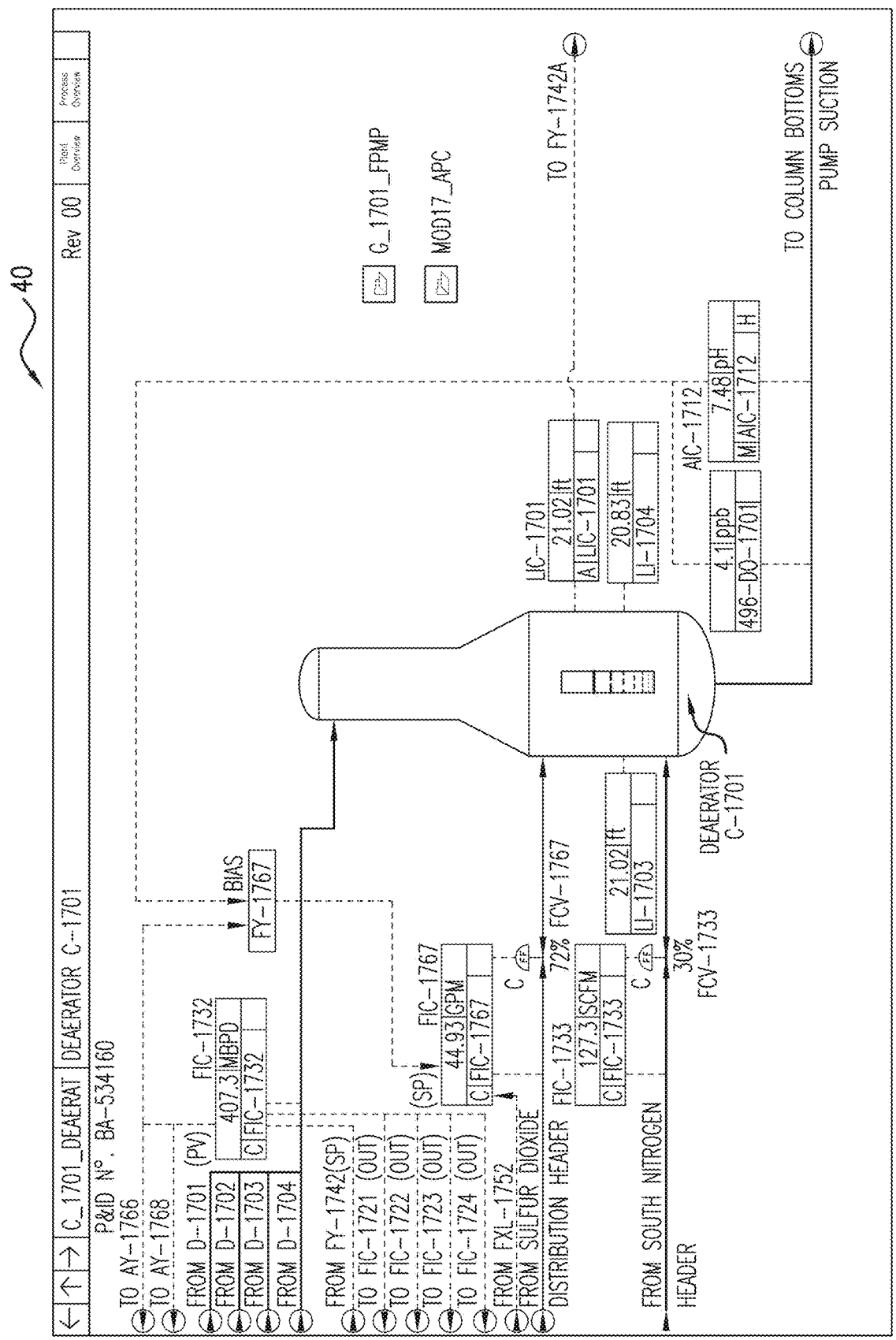
FIG. 1B is a schematic diagram of an existing control scheme for controlling DO and PH of treated seawater using an exemplary deaerator system and using traditional control methodologies.

FIG. 1B is a schematic diagram of an existing control scheme 40 for controlling DO and PH of treated seawater using an exemplary deaerator system and using traditional controls. The schematic of FIG. 1B is similar to what could be presented in the graphical user interface of a DCS system for controlling the deaerator system and associated components depicted in FIG. 1B.

Various field instruments/sensors for measuring process parameters (e.g., pressure, temperature, flow and level), final control elements and control devices can be used to monitor and control operation of a deaerator and operatively connected to an associated DCS system. The term FCV is used herein to refer to a flow control valve. The term FIC is used herein to refer to a controller that controls one or more of the valves as a function of inputs from one or more field instruments for measuring respective process variables. "Controller," as used herein, can comprise hardware and/or software-based control device.

In the exemplary control scheme 40 shown in FIG. 1B, FIC-1732 measures total filtered seawater feed/flow into the deaerator D-1701. FIC-1733 is a controller that controls operation of FCV-1733, which in turn controls the flow of N2 Gas injected into the deaerator. The set-point for FIC-1733 is generated to set N2 flow in specific ratio with total seawater feed into the deaerator. Similarly, FIC-1767 is a controller that controls operation of FCV-1767. FIC-1767 is configured to control FCV-1767 to maintain SO2 solution flow in specific ratio of total filtered seawater as defined by a setpoint. This means N2 gas flow and SO2 solution flow are each changed in specific proportion to the filtered seawater injected into the deaerator. When more seawater is fed into the deaerator, more N2 gas and more SO2 solution is injected.

The foregoing control scheme of FIG. 1B assumes that DO removal and pH are only related to N2 Gas and SO2 solution flow. However, as explained earlier, the removal of DO from seawater is a highly complex process wherein the concentration of DO in treated seawater is affected by many parameters, and the SO2 solution used as an O2 scavenger invariably also effects the pH of seawater. Moreover, the effects of these parameters on DO is non-linear and effects can get saturated at certain levels. Under these process conditions, traditional controls are not sufficiently effective in reducing and maintaining the DO of treated seawater and pH at target levels. Put another way, existing seawater treatment plants using conventional instruments and control schemes to control flow of N2 gas and SO2 solution fail to adequately take into account process conditions of other parameters which are crucial for control of DO. Due to this reason, existing systems are not able to effectively reduce DO concentration of seawater to less than 10 ppb. Embodiments of the systems and method for model predictive control effectively address these and other deficiencies of the existing systems.

Figure 2:
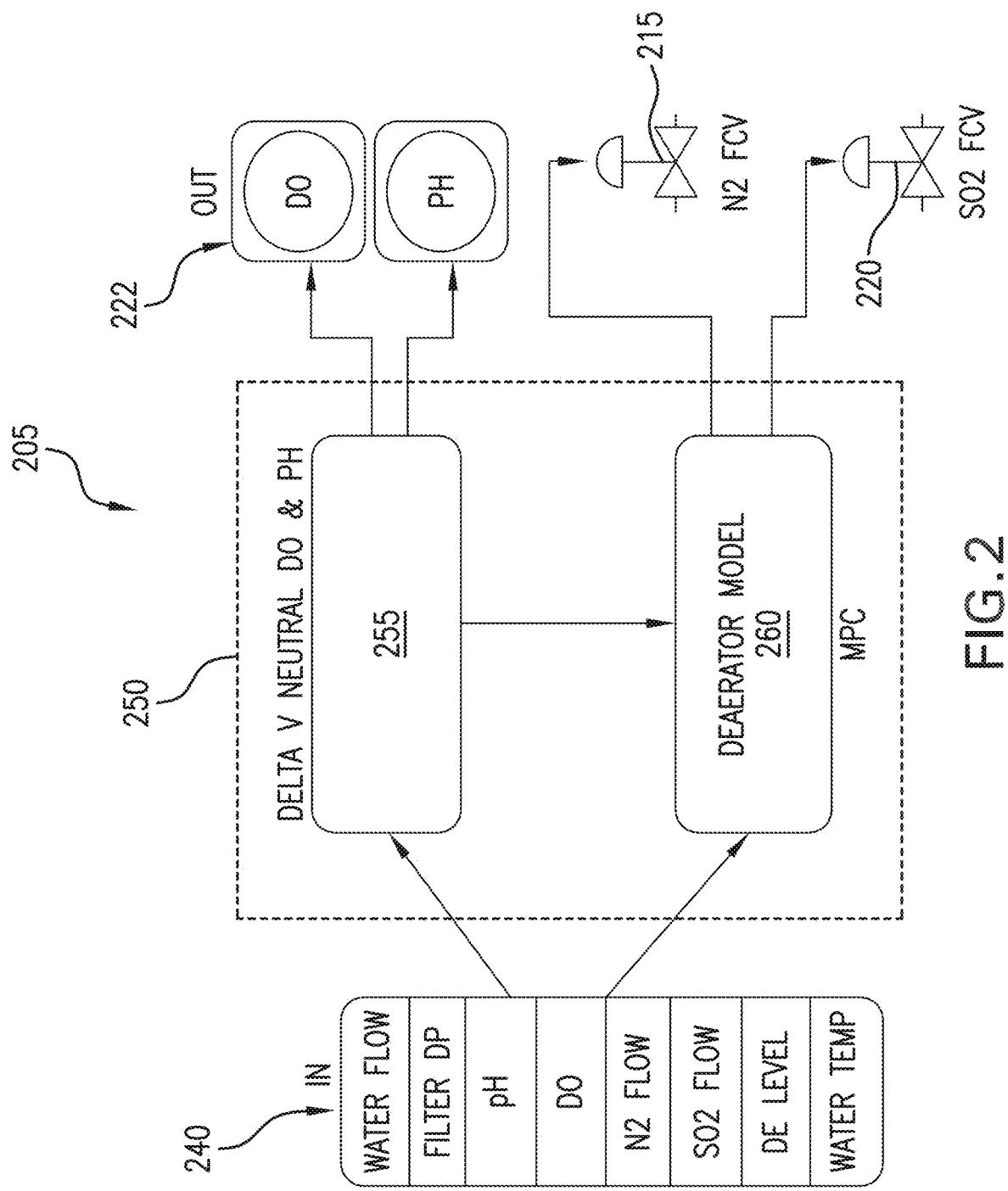
FIG. 2 is a conceptual block diagram of an exemplary system for model predictive control of a seawater treatment process system, according to an embodiment.

FIG. 2 is a conceptual block diagram of an exemplary system 205 for model predictive control of DO concentration and pH in seawater using a seawater treatment system, according to an embodiment. The system 205 comprises a control system 250 for controlling operation of a deaerator (not shown) of a seawater treatment plant. The control system 250 can be a computer implemented control system that is, for example, implemented in computing resources of a DCS system (not shown). For example and without limitation, embodiments of the system 205 can be implemented to monitor and control operation of deaerator D-1701 shown in FIG. 1B using the various field instruments, final control devices and control devices associated therewith.

The control system 250 comprises a ML module 255, and a model predictive control (MPC) module 260.

The inputs 240 to the control system 250 can include process data (also referred to as operational data, parameters or process variables) that is measured, derived or otherwise obtained from one or more field instruments, final control elements or controllers during operation of the deaerator. Input 240 can include past process data, which can be recorded from prior operation of the deaerator under existing control schemes and/or using embodiments of the model predictive control systems. Input 240 can include current or "live" process data can be obtained during current operation of the deaerator in real time or near-real time. As shown, inputs 240 can represent various operational parameters of the deaerator including, for example and without limitation, water flow (i.e., seawater flow rate into the deaerator, and out), filter DP (i.e., seawater flow through each filter upstream of the deaerator), pH (i.e., the pH level of the seawater being output), DO (i.e., the DO level of the seawater being output), N2 flow (i.e., N2 flow rate into the deaerator), SO2 flow (i.e., SO2 flow rate into the deaerator), DE level (i.e., deaerator water level) and water temp (i.e., water temperature within the deaerator). As would be understood, the values for these and other process variables can be obtained using various field devices commonly associated with deaerator systems including, for example and without limitation, flow rate sensors, temperature sensors, level sensors, pH and DO meters and the like.

The ML module 255, is configured to apply one or more machine learning algorithms, including, for example, a neural network such as Delta V Neural, to analyze the various inputs "IN" 240 to generate predicted future values 222 of DO and pH in treated seawater output by the deaerator. More specifically, during a training phase, the machine learning algorithms are applied to past processing data for a deaerator to develop the predictive model. During operation phase, the predictive model is used to predicting future levels of DO and pH from current processing data. Additionally, it should be understood that, during operation machine learning techniques are continuously applied to update and tune the predictive algorithms.

The MPC 260 is a control model for controlling various operational settings of the treatment system. In the embodiment, the MPC 260 operates based on the current processing data received as input 240 and the predicted levels of DO and pH generated by the ML module 255.

In an embodiment, an MPC 260 can be created for each deaerator, individually.

Accordingly, in some embodiments, the control system 250 can comprise a plurality of MPCs for controlling operation of a respective plurality of deaerators. As further described herein, the MPC 260 can be generated using step test methodologies and applying ML algorithms to the data gathered during step testing. The ML algorithm can include, for example, a neural network such as Delta V Neural. Other ML/neural network systems that could be used to generate the various ML-based models include Hybrid Neural Modeling by Aspentech and "Profit Controller" by Honeywell In an embodiment, the MPC 260 is configured to generate a set-point according to which the N2 FCV 215 and the SO2 FCV 220 of the deaerator are operated. These set-points will control operation of these FCVs, which in turn will control the flow of N2 Gas and SO2 Solution injected into the Deaerator during operation, which in turn should affect the DO concentration and pH of the treated seawater. The MPC 260 is also configured to receive future predicted values of DO and pH 220, which are output from the ML module 255 dynamically during operation of the system 205. The MPC 260 is thus further configured to accordingly take advance action to implement any necessary set-point adjustments to adaptively control N2 Gas and SO2 solution flow such that DO and pH of the output seawater are maintained within the required range (e.g., DO maintained at less than 10 ppb and pH between 6.9 to 7.8).

Additionally, in some embodiments, the control system 250 is further configured to use the future predicted values of pH and DO to dynamically update the MPC 260.

Figure 3:
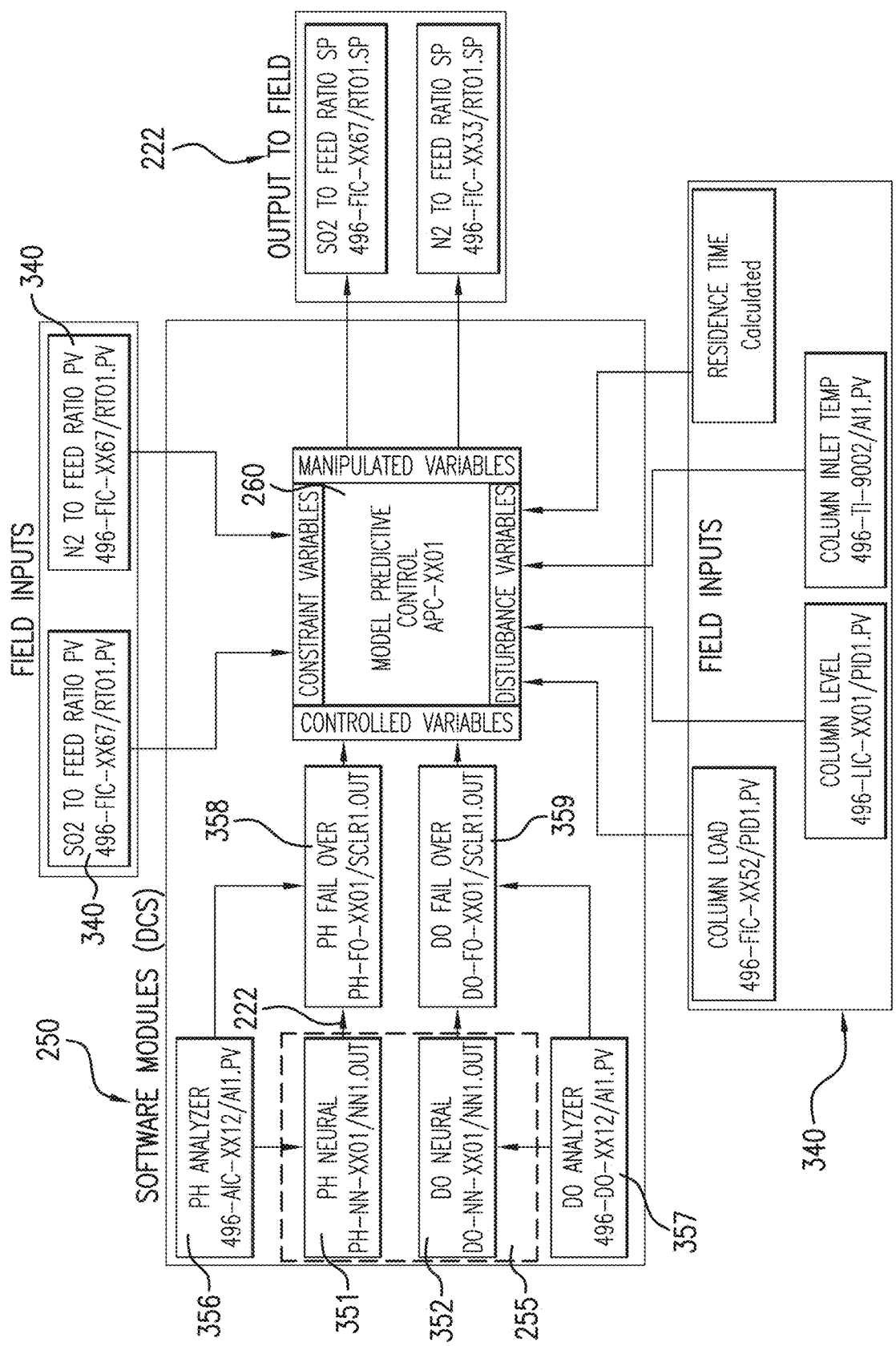
FIG. 3 is a conceptual block diagram of the exemplary system for model predictive control of a seawater treatment process system, according to an embodiment.

FIG. 3 is a conceptual block diagram providing a more detailed illustration of an exemplary configuration of the controller 250 of the system 205, according to an embodiment. As noted, the controller 250 can be implemented as one or more software modules executing within the DCS system for controlling operation of the deaerator (e.g., deaerator D-1701) and related field components.

In the exemplary embodiment of FIG. 3, the ML module 255 comprises two ML-based algorithms, namely, a PH Neural module and a DO Neural module for predicting future values 222 of pH and DO, respectively. The PH Neural and DO Neural modules receive data relating to PH and DO from a PH analyzer and DO analyzer modules, respectively The controller 250 also includes a PH Analyzer module 356 and DO Analyzer module 357. During operation, the pH Analyzer is configured to analyze current process data relating to pH and provide the current pH value(s) to the PH Neural module 351 for predicting and outputting the future pH value. The DO Analyzer is similarly configured to analyze process data relating to DO and output current DO value(s) to the DO Neural module 352 for predicting and outputting the future pH value.

As noted, the outputs 222 comprising the predicted future pH and DO values are preferably output to the MPC 260. In the exemplary embodiment shown in FIG. 3, the predicted pH value is provided to the MPC 260 via a pH Fail over module 358, which also receives the pH output of module 356. The predicted DO value, and the DO output of module 357 are similarly output to a DO Fail over module 359. Fail over modules 358 and 359 are safety mechanisms provided to trigger action (e.g., system shutdown) in the event out of specification conditions relating to pH or DO levels are detected.

A number of field inputs 340 can be provided to the MPC 260, including, for example and without limitation, the SO2 to feed ratio present value, N2 to feed ratio present value. Additional field inputs can include column load (e.g., Seawater flowing out of the deaerator), column level (e.g., the level within the column of seawater within the deaerator), seawater inlet temp (e.g., temperature of the seawater within the deaerator) and residence time, which is a measure of the amount of time that it takes for seawater entering the deaerator to be treated and output. Although not shown, inputs 340 and other inputs can be provided to modules of the controller 250 such as the ML module 255, modules 351, 352, 356, 357, 358 and 359, among other modules. It should also be understood that other control and analytical modules commonly found in a DCS system can be utilized and/or integrated into the control system 250.

Figure 6:
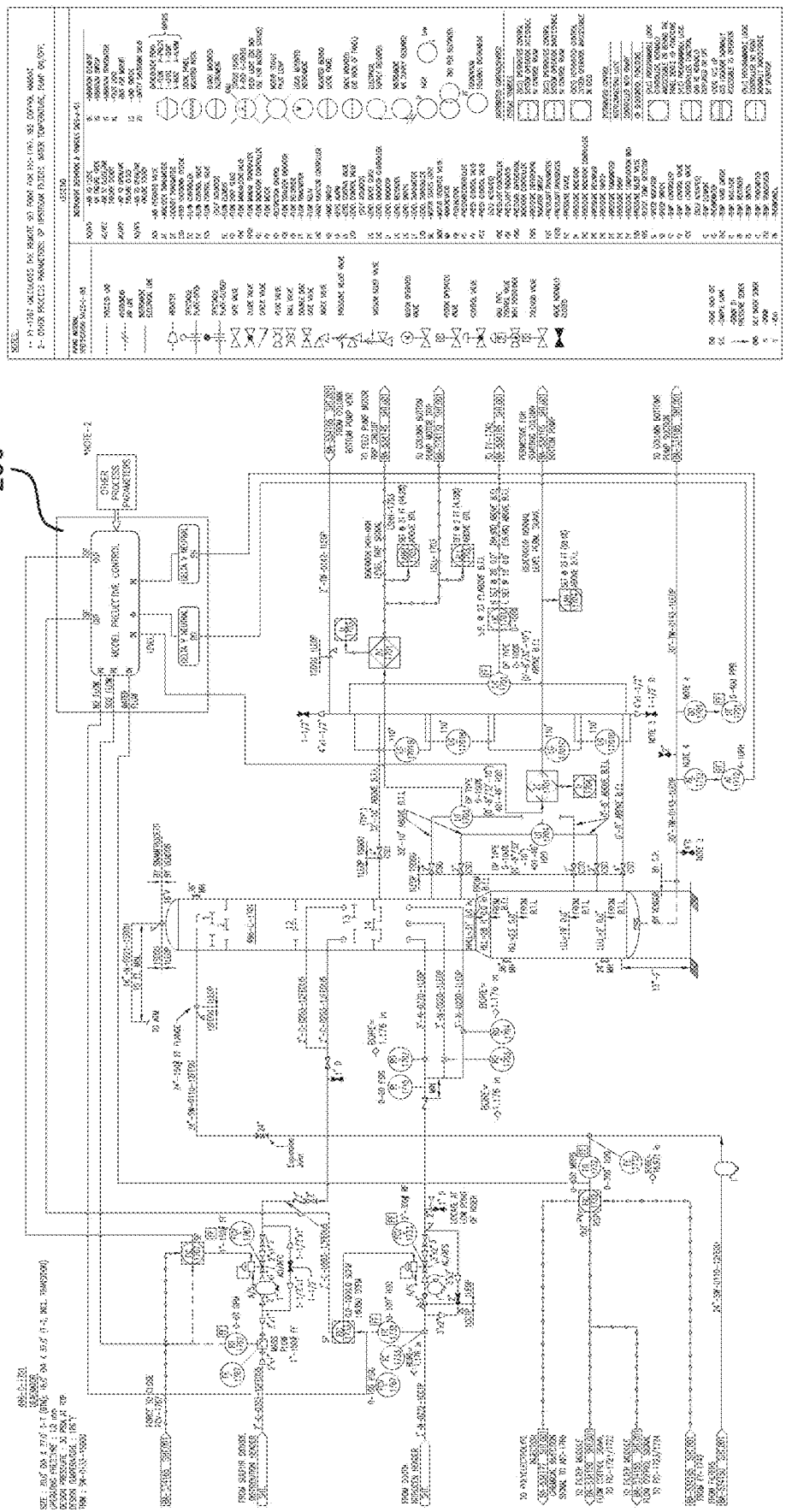
FIG. 6 is a schematic diagram of an exemplary deaerator system including a control scheme for controlling DO and PH of treated seawater, according to an embodiment.
Figure 6A:
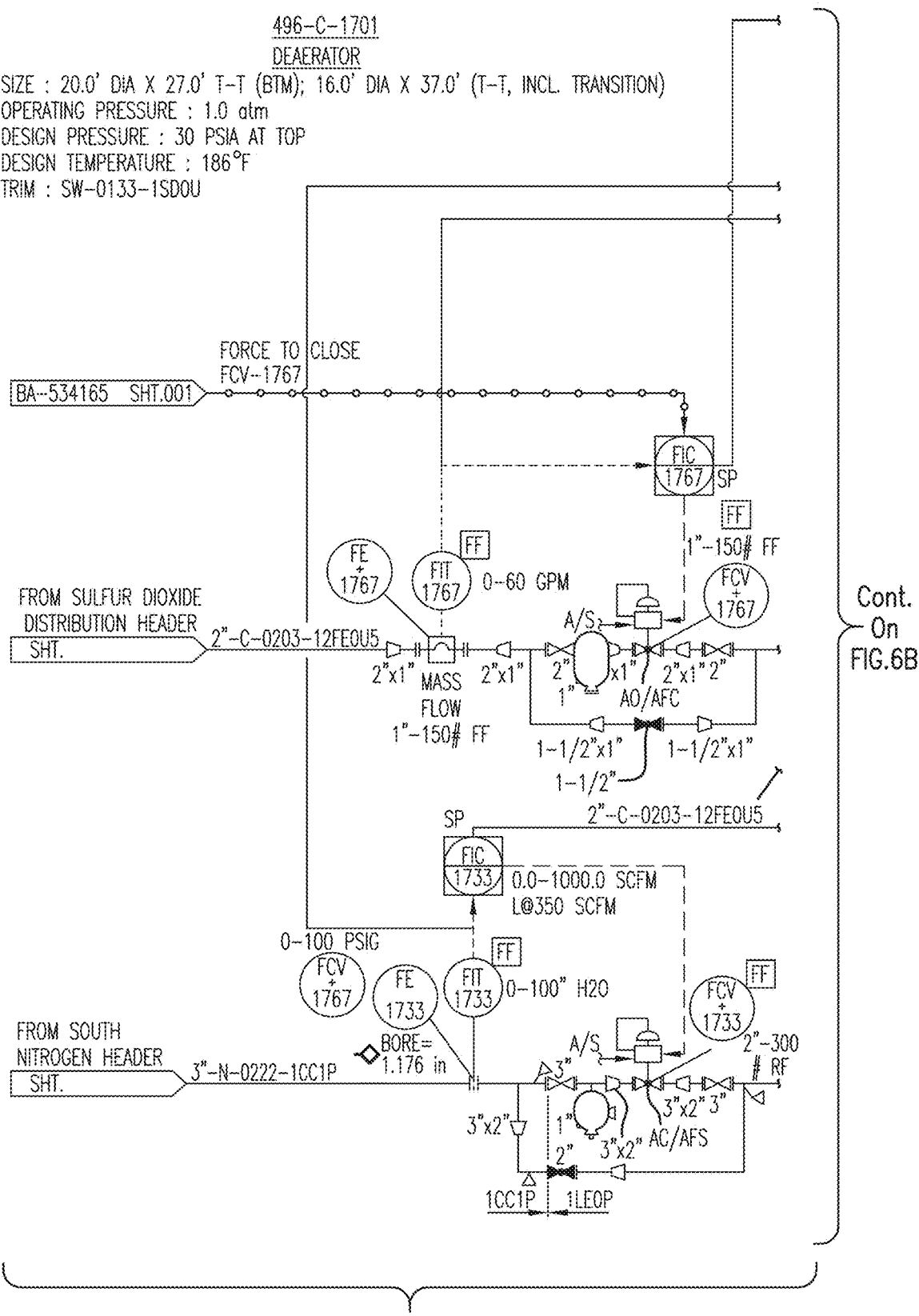
Figure 6B:
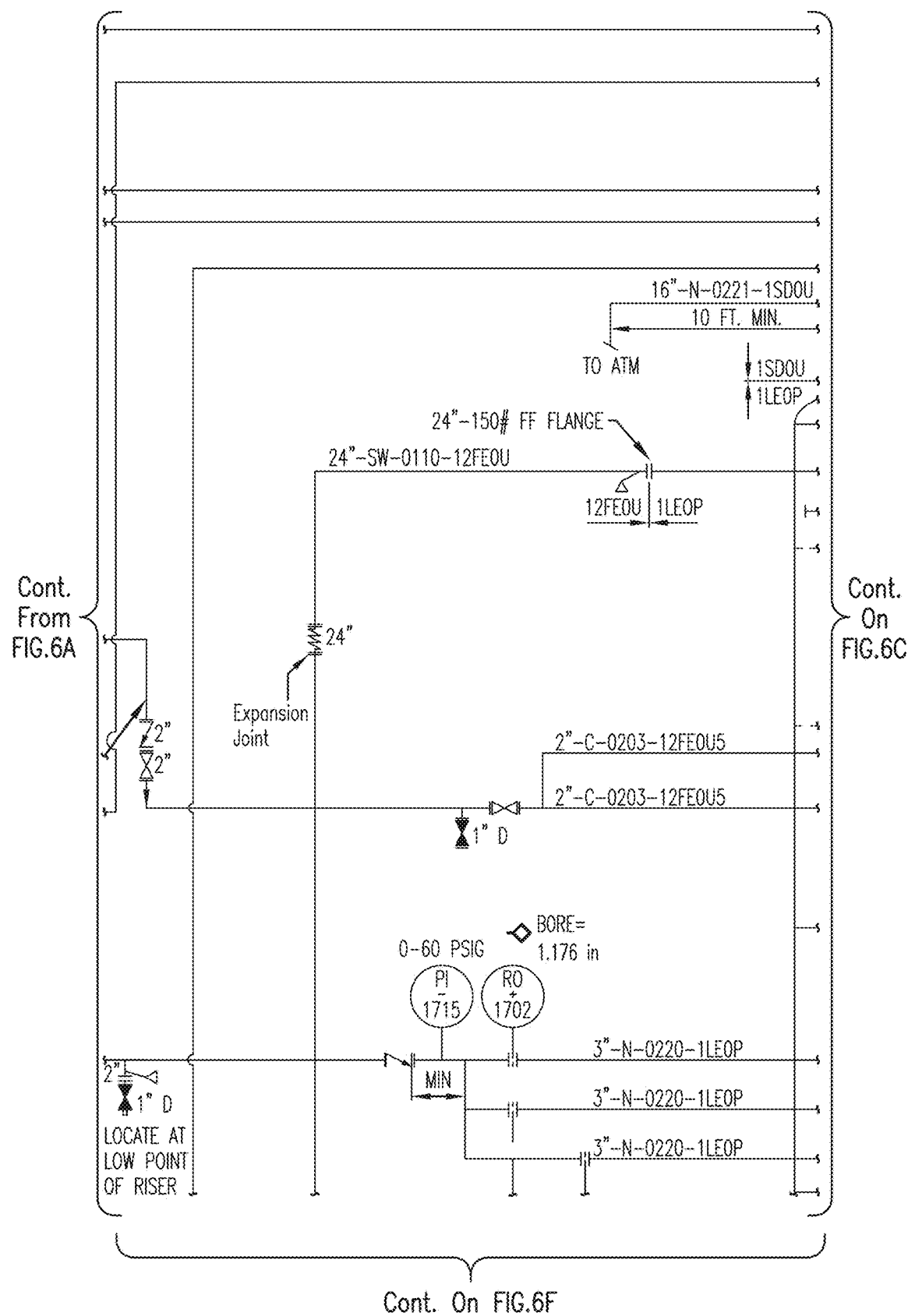
Figure 6C:
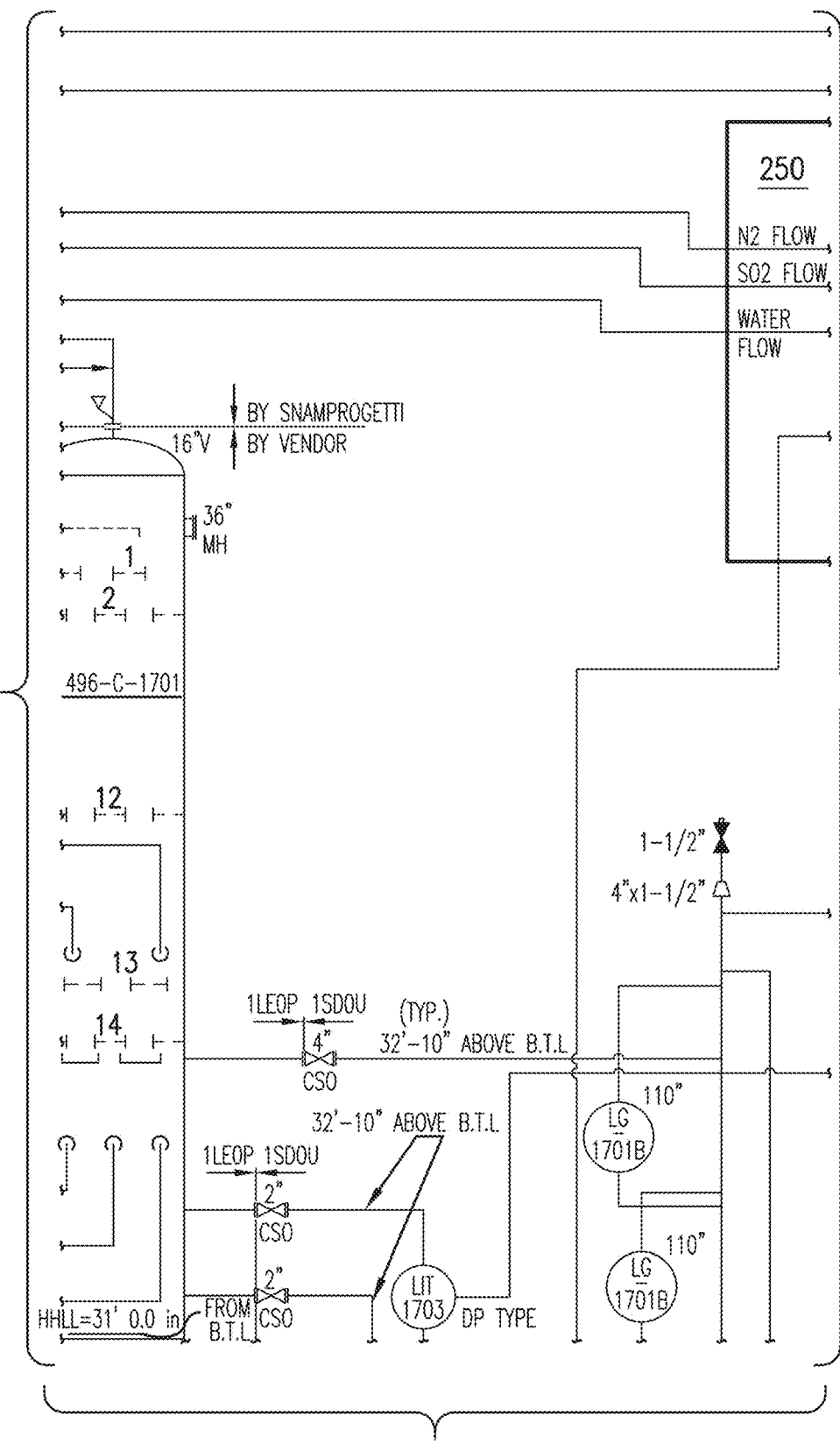
Figure 6D:
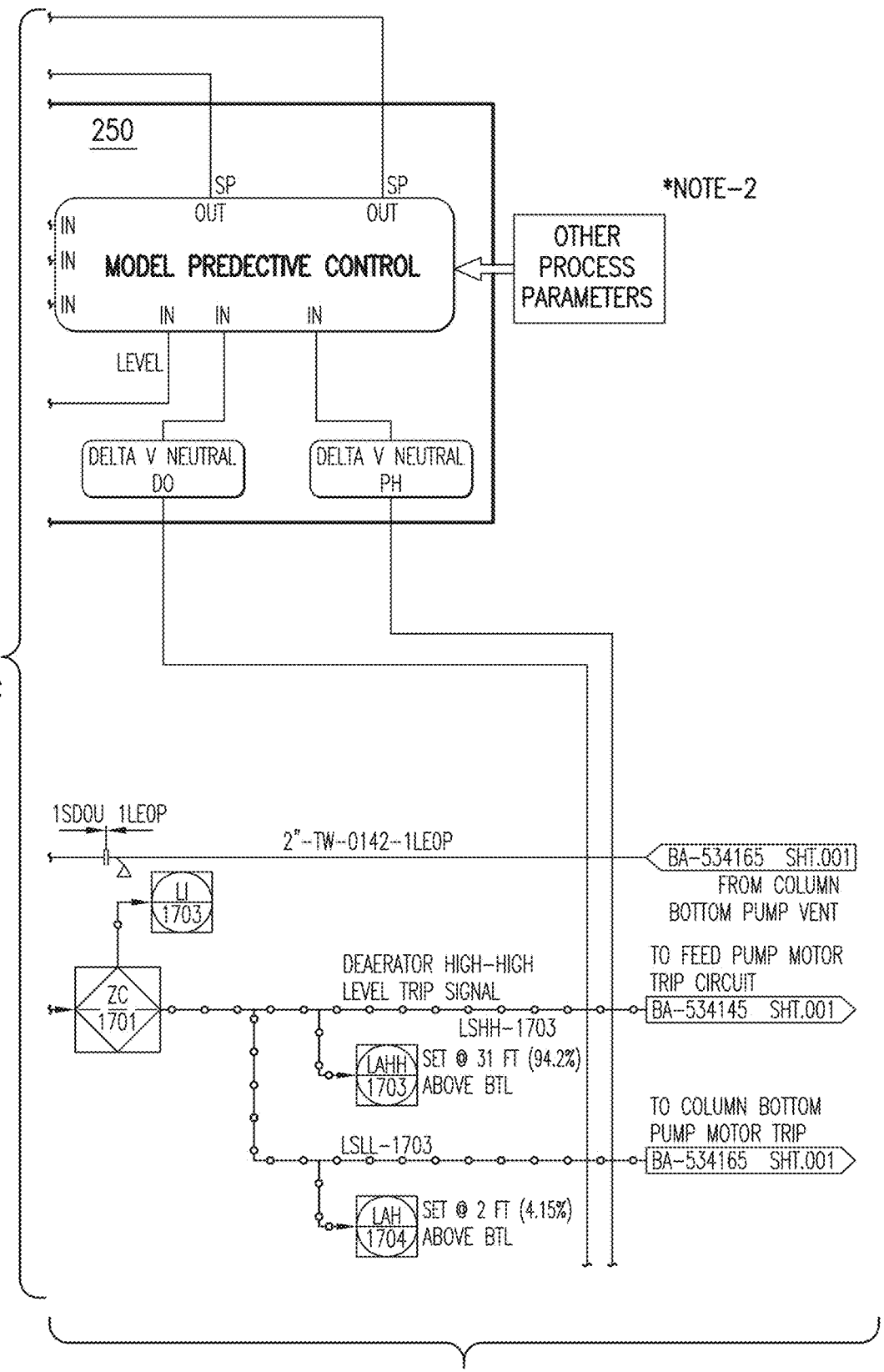
Figure 6E:
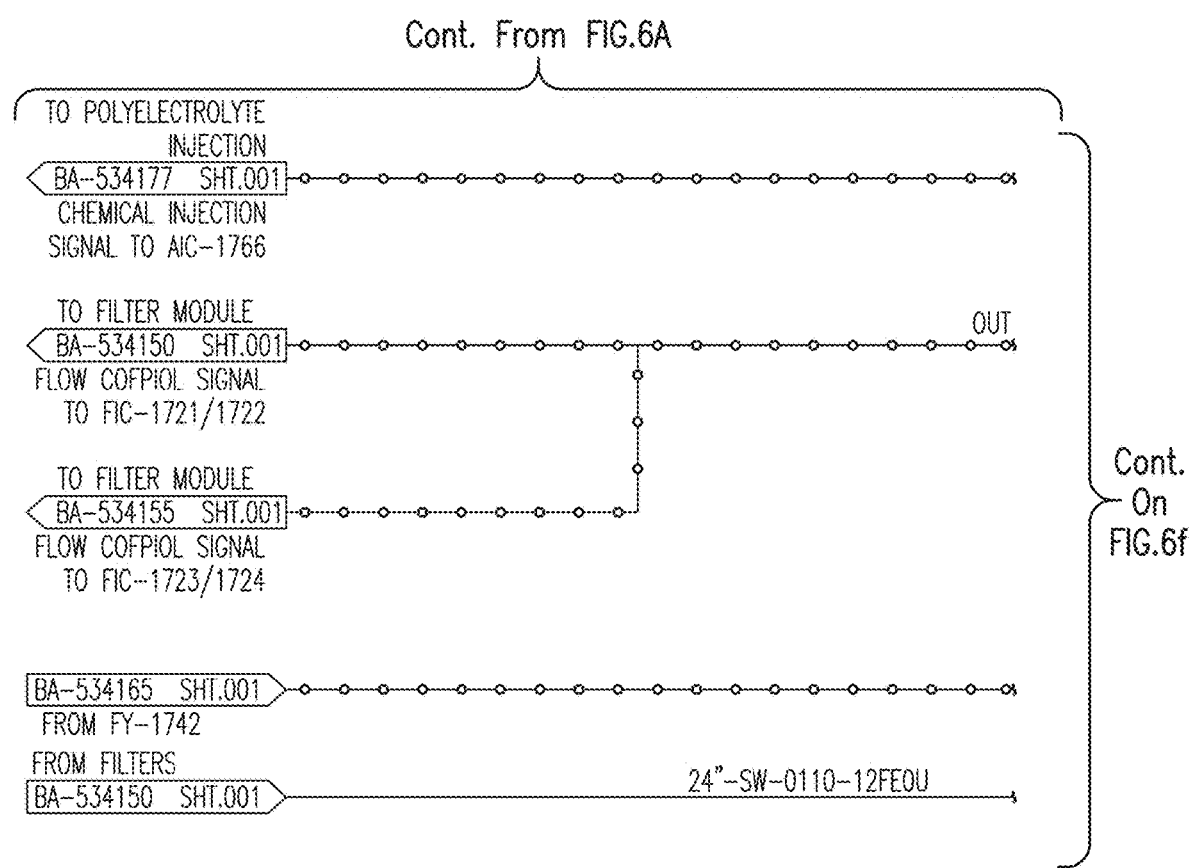
Figure 6F:
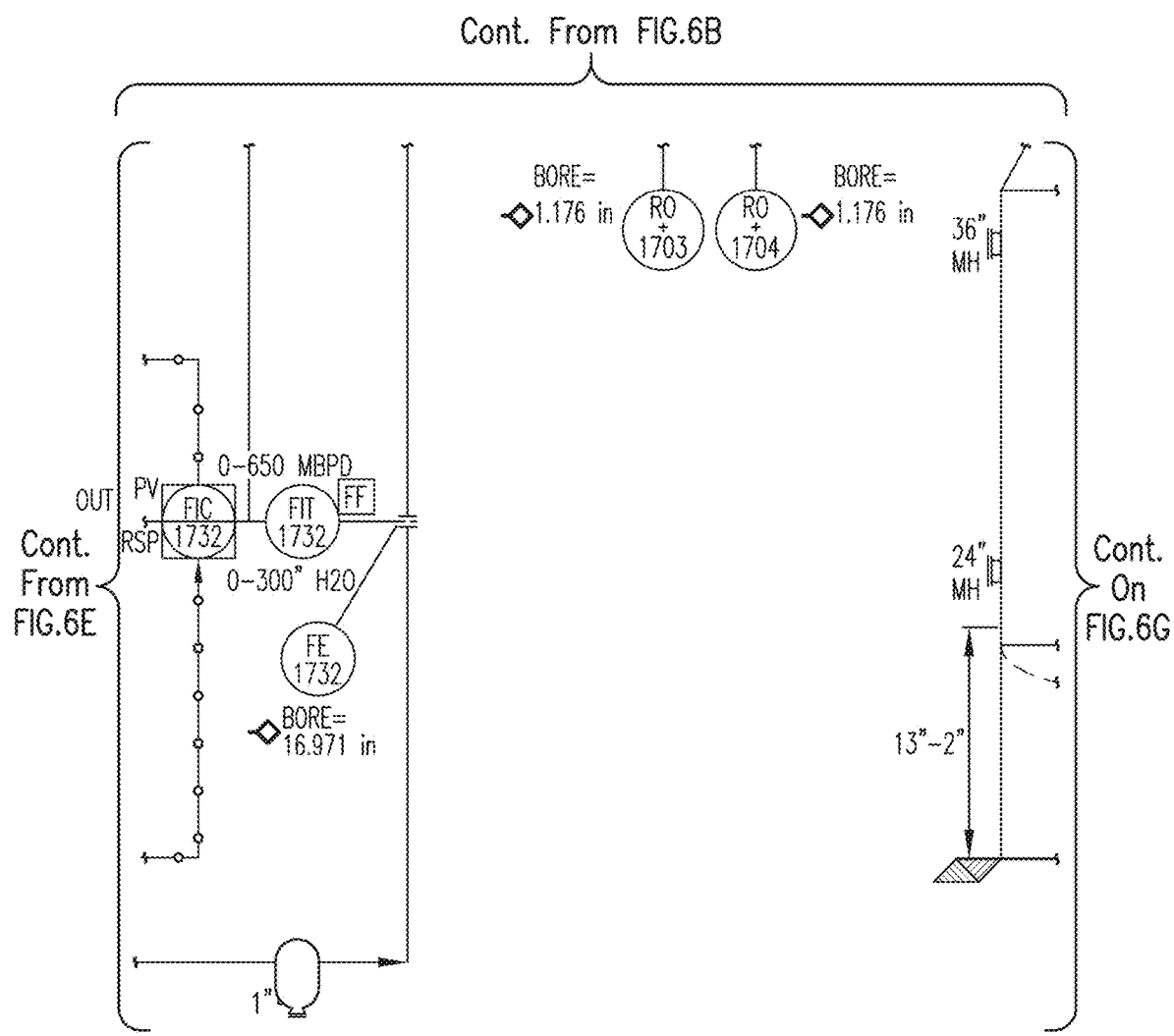
Figure 6G:
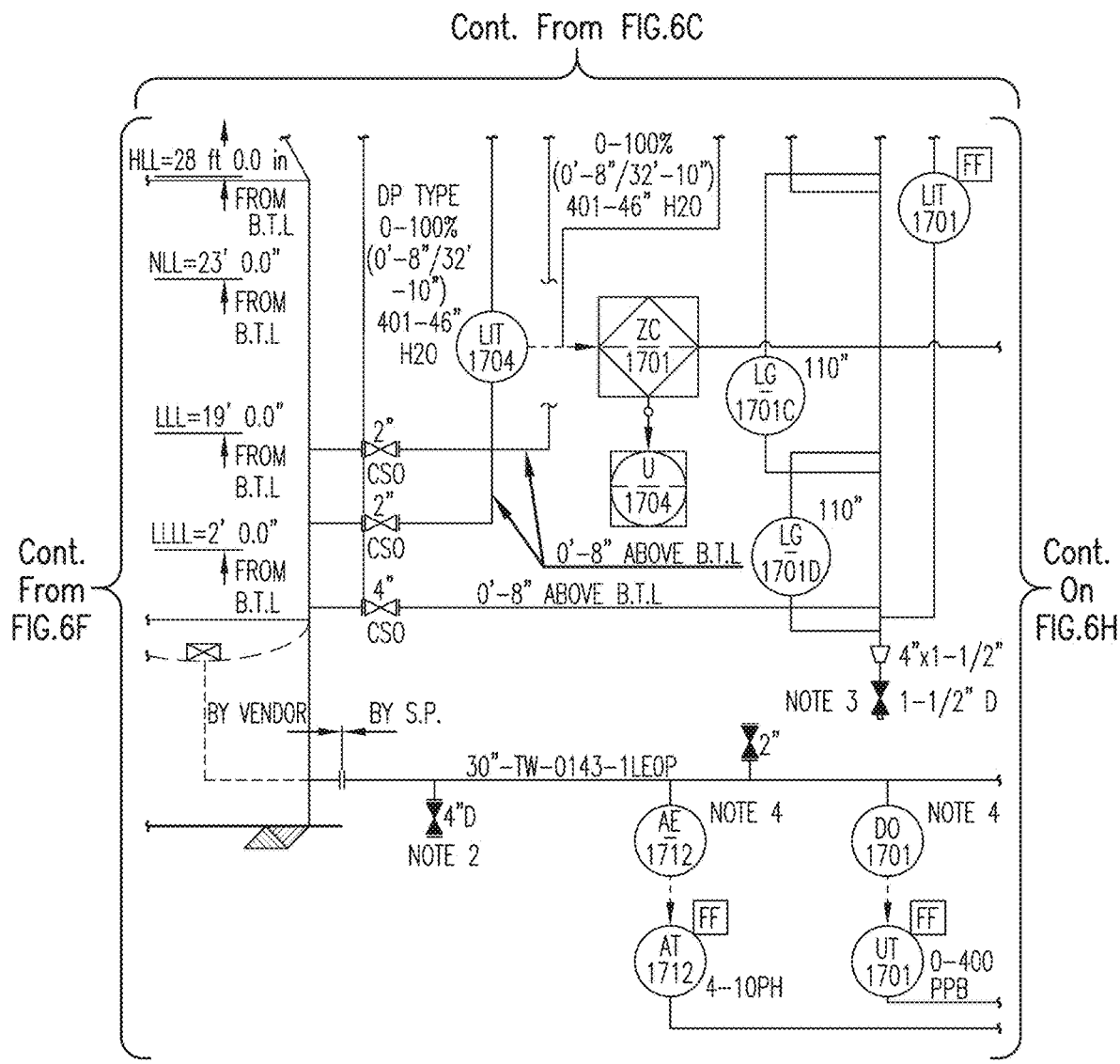
Figure 6H:
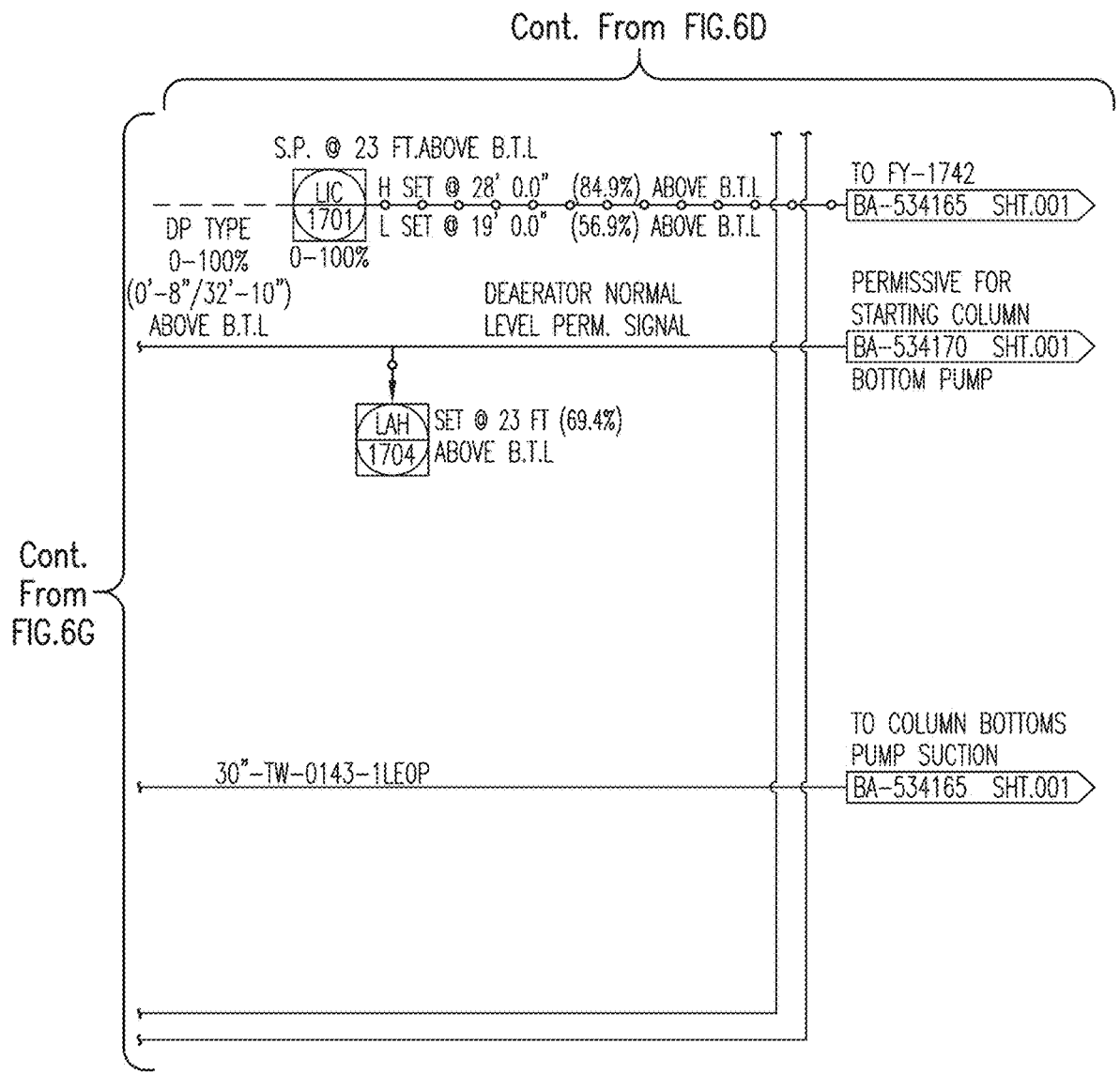
Figure 6K:
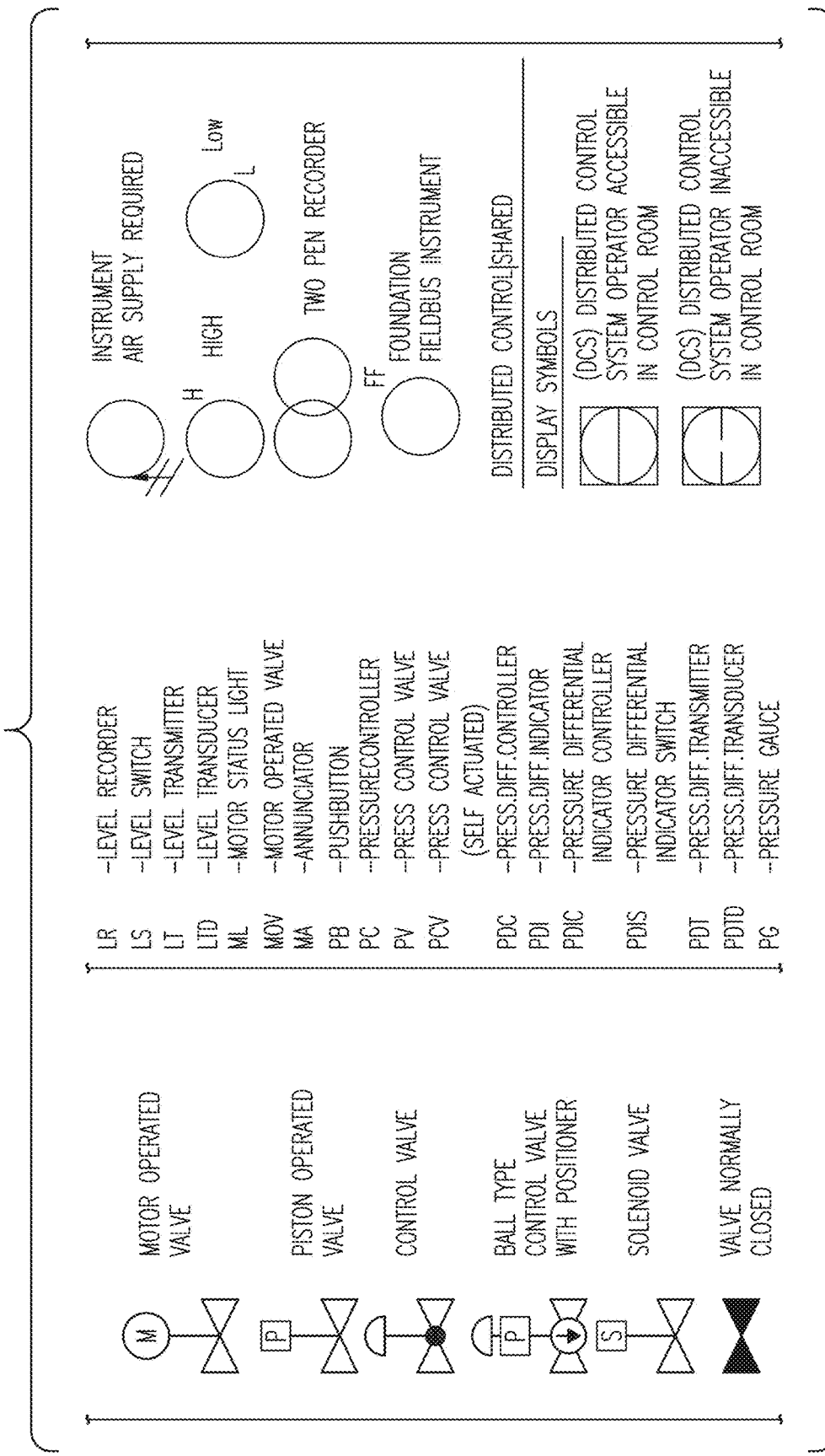

In the exemplary configuration of controller 250 shown in FIG. 3, the exemplary outputs to the field devices 222, can include setpoints according to which the N2 flow control valve (e.g., FCV 215) and the SO2 flow control valve (FCV 220) of the deaerator are operated. In the embodiment of FIG. 3 the setpoints can include, for example and without limitation, an SO2 to feed ratio setpoint and an N2 to feed ratio setpoint, wherein "feed" is the in-flow rate of seawater. For example, FIG. 6 is a schematic diagram of an exemplary deaerator system 600 comprising a controller 250 integrated for controlling DO and PH of treated seawater according to principles of the disclosure. FIGS. 6A-6L are enlarged partial views of the schematic diagram shown in FIG. 6 that, when combined as noted in the respective figures, form a detailed view of the entire schematic shown in FIG. 6.

Figure 4:
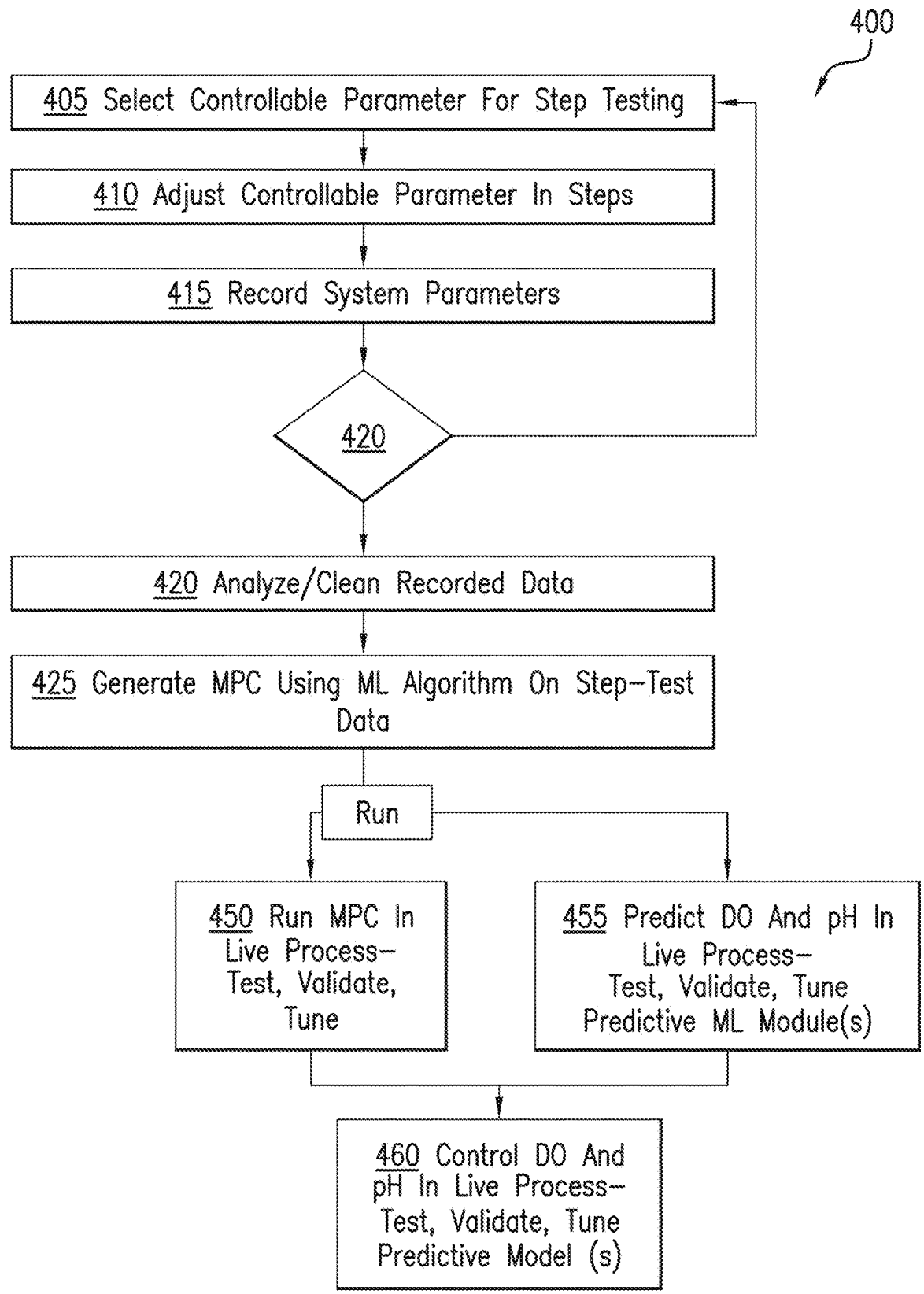
FIG. 4 is a process flow diagram illustrating a method for generating and implementing the model predictive control system using machine learning techniques according to an embodiment.

FIG. 4 is a process flow diagram illustrating a non-limiting embodiment of a method 400 that can be used to develop the MPC 260 using machine learning techniques and step test methodologies. The step test methodologies iteratively test the process system response to adjustments to the controllable operational input parameters, particularly, SO2 feed, N2 feed and seawater feed.

Prerequisites for performing the method 400 can include that the field sensors, as mentioned above, are available, working satisfactorily, and connected to the plant DCS in which the exemplary model predictive control system 250 is being implemented. Additionally, the necessary machine learning algorithms, say, Delta V Neural software, is preferably installed in the DCS. It is further preferable that the seawater treatment plant (e.g., deaerator) is operating at normal and all processes are stable.

At step 405, a controllable parameter among the plurality of controllable parameters is selected for step testing. As noted, in the exemplary deaerator systems described herein, controllable parameters of the system can include certain IN parameters 240, including, Water Flow, N2 Flow, SO2 Flow.

At step 410, the controller 250 adjusts the value of the selected parameter in steps, while all other controllable parameters are maintained at their normal operating value. For instance, each parameter can be incremented in steps of 1-2% (approx.) to a maximum upper limit and then decremented in 1-2% steps to a lower limit. For example, a normal operating value of water flow can be 400 MBD with a lower limit of 320 MBD and an upper limit of 480 MBD. During step test, water flow can be changed from 400 MBD to 405 MBD then 410 MBD and so on until the upper limit of 480 MBD is reached. After reaching the upper limit, flow can be reduced in 5 MBD steps until the lower limit of 320 MBD is reached.

It should be understood that, after each step change of a given controllable parameter, the system is allowed to stabilize before a next step is initiated.

At step 415, with each step change, the ML module 255 is configured to record the values for the various parameters 240 including, at least, the values for DO and pH in a database of the DCS system. Preferably, the value of additional parameters including, total seawater flow into the deaerator, sea water flow through each filter within the deaerator, temperature of the inlet seawater, flow of N2 gas injected, flow of SO2 solution injected, level of seawater in deaerator are similarly measured and/or recorded for each step change. The foregoing parameters can be measured using field instruments communicatively coupled to the control system 250, however, if online meters are not available, manual measurements can be collected with each step and entered manually into the DCS for recordation and further processing. The parameters of interest are at least measured after the system stabilizes. Additionally, in an embodiment, values for one or more of the parameters can be measured during stabilization (e.g., continuously or intermittently/periodically) for recordation and further processing. In an embodiment, physical pH and DO analyzers can be installed at one or more outlets of the deaerator so as to measure pH and DO of Treated seawater flowing out of the deaerator. As a result, the analyzers are part of the MPC and can provide online measurements.

After completion of step 415 for a given parameter, if it is determined at step 420 that step tests have not been performed for each controllable parameter, the process loops back to repeat steps 405-415 for another one of the controllable parameters and while keeping the other controllable parameters at normal operating value.

After completion of steps 405-415 for each of the controllable parameters, all recorded values are analyzed at step 425. At step 425, the control system can be configured to perform a preliminary analysis and cleaning operations on the data recorded during step testing, such as, rejecting outliers.

At step 430, the cleaned selected data sets are fed into the ML software, for instance, Delta V Neural, which automatically generates the MPC model 260 to control SO2 Solution and N2 Gas flow in the deaerator.

At step 450, the generated MPC 260 model for controlling DO and pH is tested for live with process for validation.

In an embodiment, model generation can include selection of the relevant Controlled Variables, Manipulated Variables and Disturbances. Selection of such parameters is an important requirement for generating a reliable and efficient MPC model. In an exemplary case these parameters are selected as follows: Controlled Variable (CV): pH and DO; Manipulated Variable (MV): SO2 Flowrate and N2 Flowrate; Disturbance Variable (DV): Column Load, Column Level, Seawater Temperature, Resident Time(calculated); Constraints: SO2 Flowrate and N2 Flowrate.

In the Delta V MPC processor block (e.g., 255 of FIG. 2) these parameters are configured as above with respective tags. Online readings of these parameters are already existing in the DCS system. Accordingly, after defining these parameters, the step-test can be conducted on all the parameters as explained above.

Step-test of DO and PH Neural is conducted first, and their model using Delta V Neural is developed, which can act as soft-sensor. DO and PH physical analyzers are connected to the MPC processor block and they provide readings for operation of the MPC. For example, step size can be selected as 5% and Time to Steady State selected at 7200 sec. Readings are recorded and analyzed and outliers are rejected. Step response provides details of the relationship between controlled variable with disturbance variables and manipulated variables.

Figure 7A:
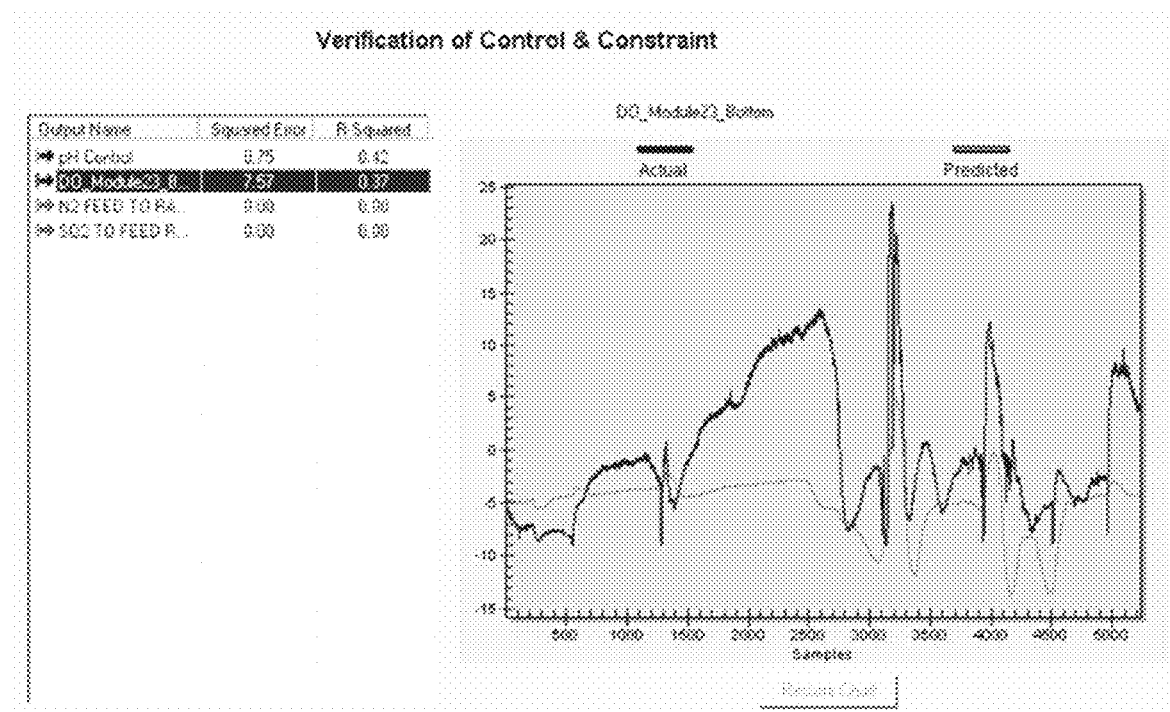
FIG. 7A is a graphical illustration of model test results, and calculated error values, according to an embodiment.
Figure 7B:
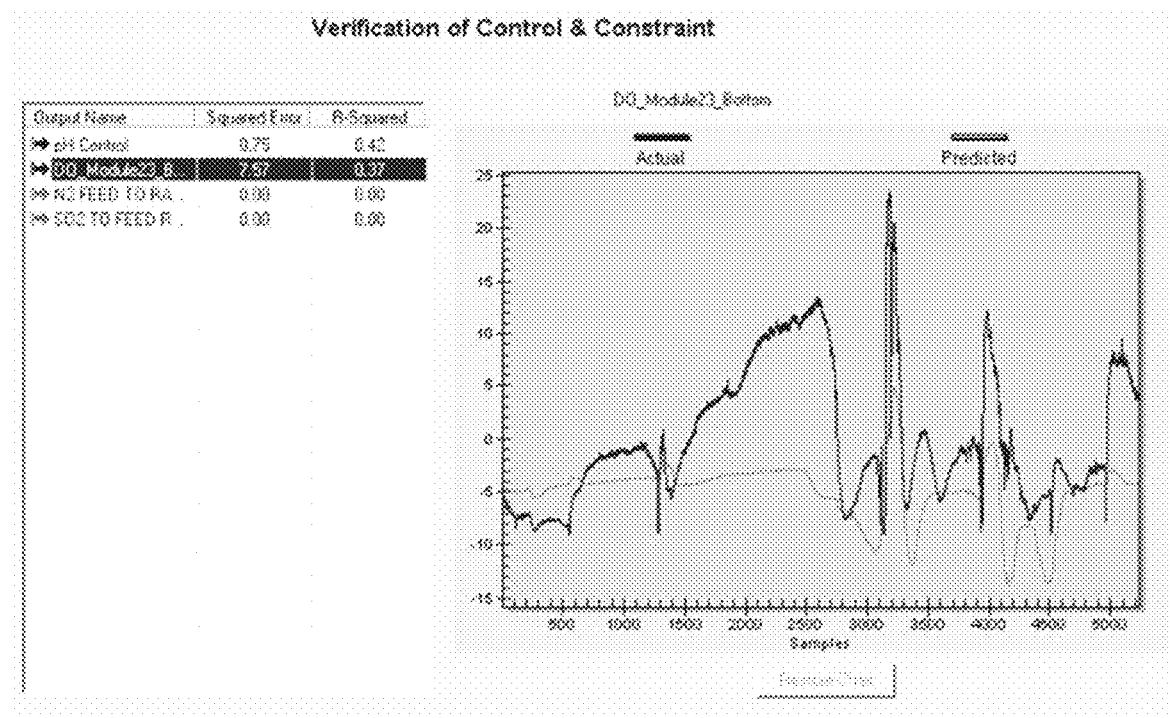
FIG. 7B is a graphical illustration of model test results, and calculated error values, according to an embodiment.
Figure 7C:
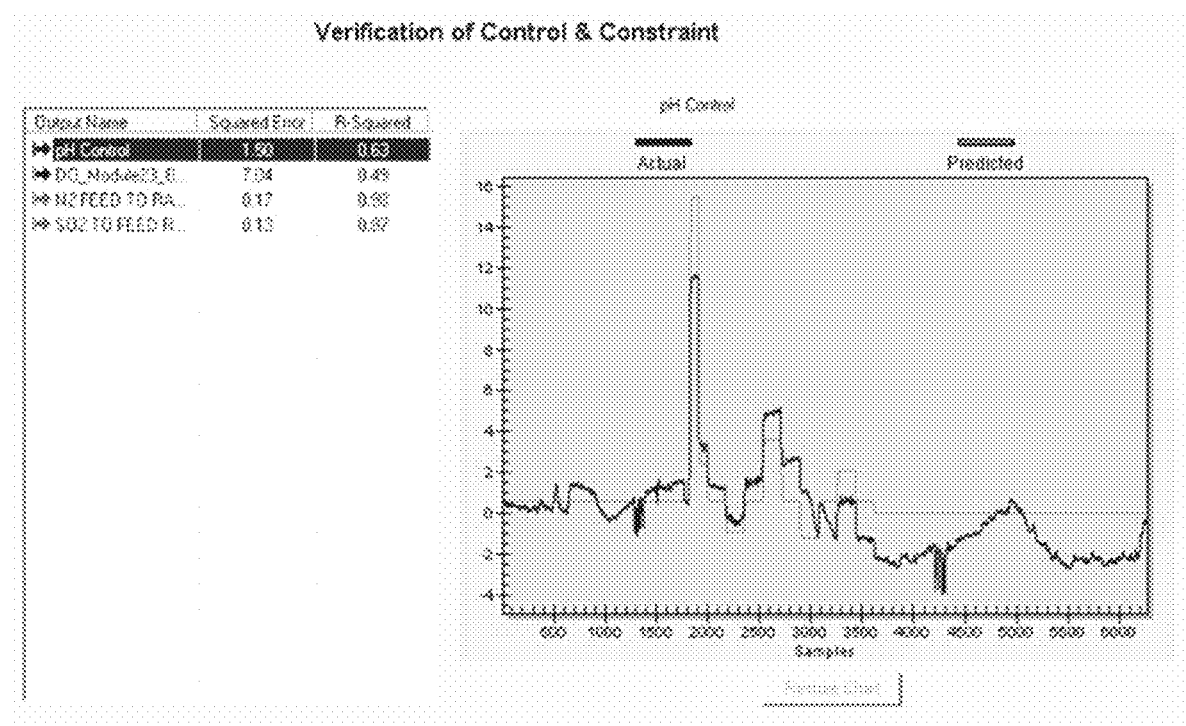
FIG. 7C is a graphical illustration of model test results, and calculated error values, according to an embodiment.

After cleaning the collected data from the step-test, a model can be generated using the MPC processor. An auto-generated model can provide default gain, and dead time for each variable. Additionally, the generated model is tested against selected data and then sampled data to evaluate for satisfactory performance. FIG. 7A is a graphical illustration including a chart 705 of predicted DO and actual DO values, and calculated error values, for a case in which the model performance is unsatisfactory. FIG. 7B is a graphical illustration including a chart 710 of predicted pH and actual pH values, and calculated error values, for a case in which the model performance is unsatisfactory. When the result is not satisfactory, against each MV, CV or DV, the sensitivity and dead time can be adjusted until a reasonably accurate model is obtained. Additionally, in some cases, step-test can be conducted again. The ultimate objective is to minimize the squared error and obtain a model with reasonable accuracy. FIG. 7C is a graphical illustration including a chart 715 of predicted pH and actual pH values, and calculated error values, for a case in which the model performance is satisfactory. This model can be further tested for satisfactory performance under simulation mode. In this mode, MV and DV can be changed to observe the model performance.

Once the model performance is determined to be satisfactory, it can be downloaded to the controller. After MPC download, when MPC is turned ON, it is configured to start controlling setpoints of the N2 FCV and the SO2 FCV (or associated controllers such as FICs). The model is validated for its online performance for a reasonable time period, for example at-least 3 days. In an embodiment, the system is configured to provide an operator the option to turn the MPC off, say, in case of unacceptable system behavior. Accordingly, the system can be configured such that, when MPC-control is turned off, standard PID controls can be activated and used. During online operation, if any issue related to the model behavior is encountered, the model can be rebuilt or adjusted according to one or more of the above procedures.

In an embodiment, at step 450, the control system 250, including, the generated MPC 260 is deployed in the DCS system to control operation of the deaerator (e.g., deaerator D-1701) and related field components in a live environment.

Additionally, at step 455, the predictive ML module 255, including the trained pH-Delta V Neural module 351 and DO-Delta V Neural module 352 are deployed in the live system to predict future values of DO and pH of Treated seawater.

At step 460, the MPC 260 is configured to, based on the predicted future value of DO concentration and pH and one or more of the values of the operational input parameters, define a setting for adjusting one of the controllable operational input parameters that serve to change or maintain the DO concentration or pH of the treated seawater within the recommended range. For instance, in an embodiment, the MPC 260 is configured to adjust N2 Gas flow and/or SO2 Solution flow by defining respective setpoints according to which the N2 FCV (e.g., FCV 215) and the SO2 FCV (e.g., FCV 220) of the deaerator are operated. More specifically, active control of the deaerator can involve the controller 250 sending a control signal to one or more of the N2 FCV and the SO2 FCV (or associated controllers such as FICs) that causes those devices to open or close in view of respective setpoints.

As should be understood, that during testing and model development and live system operation (e.g., at steps 450, 455 and 460), the various inputs 240 are measured, monitored and recorded in the database of the DCS system. The parameters can be measured continuously or intermittently/periodically as necessary. The control system 250 can be configured to monitor at least the values for DO concentration and pH during operation of the deaerator and repeat steps 255 and 260 so as to dynamically update the predicted DO concentration and predicted PH level, accordingly update the one or more settings and controllable system parameters thereby adaptively controlling operation of the seawater treatment system to produce treated seawater having less than the prescribed DO concentration and less than the prescribed pH.

Similarly, the predictive models of ML module 255 and the MPC 260 can be updated in view of the process data by repeating one or more of the steps 425-460 in order to improve the various models. Additionally, it should be understood that various aspects of steps 450-460 are similarly performed during live operation of the system.

In one exemplary practical application, the foregoing systems and methods for model predictive control were implemented in a seawater processing plant including the above-mentioned infrastructure, e.g., DCS, deaerator, field instruments and field devices. In this practical testing project, the software Delta V Neural was the ML system used to predict future value of DO and pH of treated seawater based on past operational data. In practice, the exemplary ML module has been shown to predict future values of DO and pH of treated seawater being output by the deaerator up to 30 minutes in advance with suitable accuracy. Additionally, the MPC applied using the predicted values for DO and pH and current system parameters, adaptively controlled adjustable system parameters including the flow rates of an SO2 Solution and N2 Gas to achieve the desired values of DO and pH (e.g., DO maintained at less than 10 ppb and pH between 6.9 to 7.8).

The foregoing systems and methods for developing and implementing a model predictive control can be adapted for use with other water processing systems provided that the particular process at the plant is understood. Additionally, it is preferable that measurement of all relevant parameters that have impact on DO of seawater in that process are preferably available at the plant DCS system and that step test can be conducted when the plant is operating in stable condition.

Figure 5:
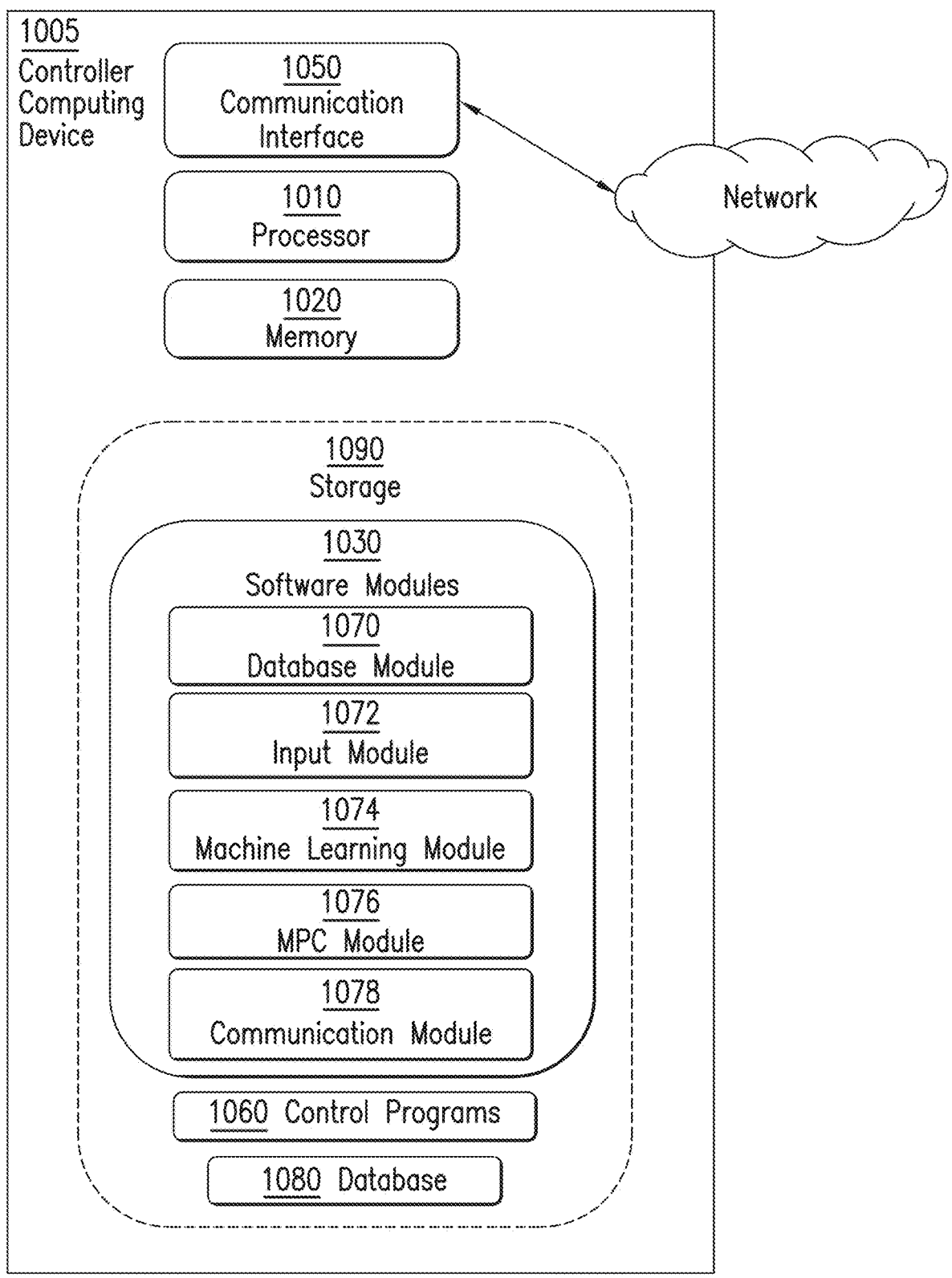
FIG. 5 is a block diagram of a controller computing device such as computing device of a DCS system, according to an embodiment.

An exemplary configuration of a controller computing device such as computing device of a DCS system within which the exemplary controller 250 can be implemented is shown and described in connection with FIG. 5. The methods discussed above can be accomplished in whole or in part using the controller computing device 1005, as described in further detail below.

In a non-limiting example, the controller computing device 1005 can be arranged with various hardware and software components that serve to enable operation of the system, including a processor 1010, a memory 1020, a communication interface 1050 and a computer readable storage medium 1090. The processor 1010 serves to execute software instructions that can be loaded into the memory 1020. The processor 1010 can be a number of processors, a multi-processor core, or some other type of processor, depending on the particular implementation. In one or more embodiments, the one or more separators 1015 can also comprise various hardware and software components (e.g., processor, memory, communication interface).

Preferably, the memory 1020 and/or the storage 1090 are accessible by the processor 1010, thereby enabling the processor 1010 to receive and execute instructions stored on the memory 1020 and/or on the storage 1090. The memory 1020 can be, for example, a random access memory (RAM) or any other suitable volatile or non-volatile computer readable storage medium. In addition, the memory 1020 can be fixed or removable. The storage 1090 can take various forms, depending on the particular implementation. For example, the storage 1090 can contain one or more components or devices such as a hard drive, a flash memory, a rewritable optical disk, a rewritable magnetic tape, or some combination of the above. The storage 1090 also can be fixed or removable or remote such as cloud based data storage systems.

One or more software modules 1030 are encoded in the storage 1090 and/or in the memory 1020. The software modules 1030 can comprise one or more software programs or applications having computer program code or a set of instructions executed in the processor 1010. Such computer program code or instructions for carrying out operations and implementing aspects of the systems and methods disclosed herein can be written in any combination of one or more programming languages. The program code can execute entirely on controller computing device 1005, as a standalone software package, partly on the controller computing device 1005 and partly on a remote computer/device or entirely on such remote computers/devices. In the latter scenario, the remote computer systems can be connected to controller computing device 1005 through any type of network, including a local area network (LAN) or a wide area network (WAN), or the connection can be made through an external computer (for example, through the Internet using an Internet Service Provider).

Preferably, included among the software modules 1030 are a database module 1070, an input module 1072, a machine learning module 1074, an MPC module 1076, and a communication module 1078, are executed by processor 1010. During execution of the software modules 1030, the processor 1010 is configured to perform various operations relating to the configuration of the controller computing device 1005. More specifically, MPC module configures the processor to perform the various operations described above as being performed by the MPC 260. Machine learning module 1074 configures the processor to perform the various operations described above as being performed by the ML module 255. Input module 1072 configures the processor to receive operational/process data inputs from the seawater treatment plant. Database module 1070 configures the processor to perform various data storage operations. Communication module 1078 configures the processor to communication with various components of the seawater treatment plants such as sending operational instructions. In addition, it should be noted that other information and/or data relevant to the operation of the present systems and methods can also be stored on the storage 1090, for instance various control programs 1060 used in the operation of the controller computing device 1005, and MPS system and related process system infrastructure.

A database 1080 can also be stored on the storage 1090. Database 1080 can contain and/or maintain various data items and elements that are utilized throughout the various operations of the system. Preferably, some or all of the stored information in the database 1080 can be actionable data that is in a form or can be transformed into a form that enables the controller computing device 1005 to undertake an action as needed by the program that implements any given application. The database 1080 can also include device-specific applications that, when executed by the processor 1010, configure the processor to communicate with the one or seawater treatment plants. Similarly, the database can store other operational parameters that are specific to the controller computing device 1005 and/or water treatment plants.

It should be noted that although database 1080 is depicted as being configured locally to the storage of the controller computing device 1005, in certain implementations, database 1080 and/or various of the data elements stored therein can be located remotely (such as on a remote server—not shown) and connected to the controller computing device 1005 through a network in a manner known to those of ordinary skill in the art.

A communication interface 1050 is also operatively connected to the processor 1010 and can be any interface that enables communication between the controller computing device 1005 and external devices, machines and/or elements such as a seawater treatment plant and its components. Preferably, the communication interface 1050 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting controller computing device 1005 to other computing devices and/or communication networks, such as private networks and the Internet. Such connections can include a wired connection or a wireless connection (e.g., using the IEEE 802.11 standard) though it should be understood that communication interface 1050 can be practically any interface that enables communication to/from the controller computing device 1005.

As mentioned above, the methods of the present application can be accomplished in whole or in part, using the system 1000, and in particular the controller computing device 1005.

At this juncture, it should be noted that although much of the foregoing description has been directed to systems and methods for model predictive control of a seawater treatment plant, the systems and methods disclosed herein can be similarly deployed and/or implemented in scenarios, situations, and settings far beyond the referenced scenarios. It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a system, processes and computer implemented control methods, computer system, and computer program product for controlling DO and PH of treated seawater. The flowchart and block diagrams in the figures illustrate the architecture, functionality, and operation of possible implementations of systems, methods and computer program products according to various embodiments and arrangements. In this regard, each block in a flowchart or block diagrams as it relates to a computer implemented method can represent a module, segment, or portion of code, which comprises one or more executable instructions for implementing the specified logical function(s).

It should also be noted that, in some alternative implementations, the functions described herein or noted in a block diagram may occur out of the order noted. For example, two blocks or operations shown or described in succession may, in fact, be executed substantially concurrently, or may sometimes be executed in the reverse order, depending upon the functionality involved. It will also be noted that functional blocks or operations can, where applicable, be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A computer implemented method for model predictive control of a seawater treatment system for removing dissolved oxygen (DO) from seawater to produce treated seawater having less than a prescribed DO concentration and a prescribed pH, wherein an inlet provides untreated seawater into a vessel of the treatment system at an inflow rate which is controllable by a feed flow control valve (FCV), a N2 feed line delivers N2 gas into the vessel at an N2 flow rate which is controllable by an N2 FCV, an SO2 feed line delivers an SO2 solution into the vessel at an SO2 flow rate which is controllable by an SO2 FCV, and wherein the treated seawater is output from the vessel through an outlet, the method comprising the steps of:

receiving, at a processor of a controller computing device, wherein the processor is executing program code that is in the form of software modules and stored in a non-transitory storage medium, values of operational input parameters of the seawater treatment system including, the inflow rate, the N2 flow rate, the SO2 flow rate, a DO concentration of the treated seawater, and a pH of the treated seawater, wherein the inflow rate, the N2 flow rate and the SO2 flow rate are controllable operational input parameters, and wherein the software modules comprise a predictive machine learning model, and a model predictive control algorithm;

calculating, with the processor using the predictive machine learning model and based on the values of the operational input parameters, a predicted DO concentration and a predicted pH of the treated seawater for a future point in time;

determining, with the processor using the model predictive control algorithm and based on the predicted DO concentration and predicted pH and one or more of the operational input parameters, a setting for adjusting one of the controllable operational input parameters to change or maintain the DO concentration or pH of the treated seawater;

controlling, with the processor, operation of the seawater treatment system according to the setting, wherein the controlling step comprises sending, by the processor to the seawater treatment system over a communication interface, a control signal configured to adjust one or more of the feed FCV, N2 FCV and the SO2 FCV as a function of the setting;

monitoring, with the processor, at least the DO concentration and the pH of the treated seawater during operation of the seawater treatment system, wherein the DO concentration and the pH are measured using one or more sensors exposed to the treated seawater; and based on the monitoring step, dynamically performing, with the processor during operation of the seawater treatment system, the calculating, determining and controlling steps such that the treated seawater output has less than the prescribed DO concentration and has less than the prescribed pH.

2. The method of claim 1, wherein the predictive machine learning model is a neural network trained on prior operational data comprising values of the operational input parameters measured during prior operation of the seawater treatment system.

3. The method of claim 2, wherein the neural network comprises a first neural network trained to generate the predicted DO concentration and a second neural network trained to generate the predicted pH.

4. The method of claim 1, further comprising:

prior to the determining step, generating, with the processor, the predictive model control algorithm using a machine learning algorithm applied to values for the operational input parameters recorded during a testing operation performed using the seawater treatment system.

5. The method of claim 4, wherein the testing operation comprises a step test, and further comprising:

performing the step test, the step test including:
selecting one controllable operational input parameter among the controllable operational input parameters,
iteratively adjusting the value of the one operational input parameter in prescribed amounts, while maintaining other controllable operational input parameters among the controllable operational input parameters at a respective normal operating value,
recording values for the operational input parameters with each iteration, and
repeating the selecting, iteratively adjusting and recording steps for each of the other controllable operational input parameters individually; and
applying a machine learning algorithm to the values for the operational input parameters recorded during the step test.

6. The method of claim 1, wherein the operational input parameters further comprise one or more of a rate of seawater flow through one or more filters within the vessel, a level of seawater within the vessel, and a temperature of seawater flowing into the vessel.

7. The method of claim 1, wherein the controller computing device is a distributed control system and wherein the vessel is a deaerator vessel.

8. The method of claim 1, wherein the setting is one or more of an N2 setpoint and an SO2 setpoint, wherein the N2 setpoint is a ratio of the N2 flow rate to the inflow rate, and wherein the SO2 setpoint comprises a ratio of the SO2 flow rate to the inflow rate.

9. A model predictive control system for controlling operation of a seawater treatment system for removing dissolved oxygen (DO) from seawater to produce treated seawater having less than prescribed DO concentration and a prescribed pH, the seawater treatment system including an inlet providing untreated seawater into a vessel of the treatment system at an inflow rate which is controllable by a feed flow control valve (FCV), a N2 feed line delivering N2 gas into the vessel at an N2 flow rate which is controllable by an N2 FCV, an SO2 feed line delivering an SO2 solution into the vessel at an SO2 flow rate which is controllable by an SO2 FCV, and an outlet through which the treated seawater is output from the vessel, the model predictive control system comprising:

a controller computing device including: a processor, an input/output interface and a non-transitory computer readable storage medium, and software modules stored in the storage medium and executable by the processor, wherein the software modules include:

an input module that configures the processor to receive values for operational input parameters of the seawater treatment system including, the inflow rate, the N2 flow rate, the SO2 flow rate, a DO concentration of the treated seawater, and a pH of the treated seawater, wherein the inflow rate, the N2 flow rate and the SO2 flow rate are controllable operational input parameters;

a machine learning (ML) module, that configures the processor to calculate, based on the values of the operational input parameters, a predicted DO concentration and a predicted pH of the treated seawater for a future point in time;

a model predictive control module that configures the processor to, based on the predicted DO concentration and predicted pH and one or more of the values of the operational input parameters, define a setting for adjusting one of the controllable operational input parameters to change or maintain the DO concentration or pH of the treated seawater, wherein the model predictive control module further configures the processor to send a control signal for adjusting one or more of the feed FCV, N2 FCV and the SO2 FCV as a function of the setting, and wherein the processor is further configured to monitor at least the values for DO concentration and pH during operation of the seawater treatment system and dynamically update the predicted DO concentration and predicted PH, and accordingly update the setting to adaptively control operation of the seawater treatment system to produce treated seawater having less than the prescribed DO concentration and less than the prescribed pH.

10. The system of claim 9, wherein the ML module is a neural network trained on prior operational data comprising values of the operational input parameters measured during prior operation of the seawater treatment system.

11. The system of claim 10, wherein the neural network comprises a first neural network trained to generate the predicted DO concentration and a second neural network trained to generate the predicted pH.

12. The system of claim 11, wherein the predictive model control algorithm is generated using a neural network applied to values for the operational input parameters recorded during a testing operation performed using the seawater treatment system.

13. The system of claim 9, wherein the operational input parameters further comprise one or more of a rate of seawater flow through one or more filters within the vessel, a level of seawater within the vessel, and a temperature of seawater flowing into the vessel.

14. The system of claim 9, wherein the controller computing device is a distributed control system.

15. The system of claim 9, wherein the setting is one or more of an N2 setpoint and an SO2 setpoint, wherein the N2 setpoint is a ratio of the N2 flow rate to the inflow rate, and wherein the SO2 setpoint comprises a ratio of the SO2 flow rate to the inflow rate.

16. The system of claim 9, wherein the DO concentration and the pH are measured using one or more sensors exposed to the treated seawater.

17. The system of claim 9, further comprising the seawater treatment system, wherein the seawater treatment system is a deaerator, and wherein the feed FCV, the N2 FCV and the SO2 FCV are operatively connected to the processor.

* * * * *